(12) United States Patent
Tazume

(10) Patent No.: US 11,396,273 B2
(45) Date of Patent: Jul. 26, 2022

(54) PACKAGE DELIVERY METHOD, PACKAGE DELIVERY SYSTEM AND DELIVERY MANAGEMENT DEVICE

(71) Applicant: RAKUTEN GROUP, INC., Tokyo (JP)

(72) Inventor: Toshiaki Tazume, Tokyo (JP)

(73) Assignee: RAKUTEN GROUP, INC., Tokyo (JP)

(*) Notice: Subject to any disclaimer, the term of this patent is extended or adjusted under 35 U.S.C. 154(b) by 28 days.

(21) Appl. No.: 17/253,100

(22) PCT Filed: Nov. 25, 2019

(86) PCT No.: PCT/JP2019/046007
§ 371 (c)(1),
(2) Date: Dec. 16, 2020

(87) PCT Pub. No.: WO2021/106045
PCT Pub. Date: Jun. 3, 2021

(65) Prior Publication Data
US 2021/0370869 A1    Dec. 2, 2021

(51) Int. Cl.
*B60R 25/20* (2013.01)
*G06Q 10/08* (2012.01)
*B60R 25/01* (2013.01)
*B65G 61/00* (2006.01)

(52) U.S. Cl.
CPC .............. *B60R 25/20* (2013.01); *B60R 25/01* (2013.01); *B65G 61/00* (2013.01); *G06Q 10/0832* (2013.01)

(58) Field of Classification Search
CPC ......... B60R 25/20; B60R 25/01; B65G 61/00; G06Q 10/0832; G06Q 10/083; G06Q 10/0834
USPC ........................................................ 340/5.61
See application file for complete search history.

(56) References Cited

U.S. PATENT DOCUMENTS

| | | |
|---|---|---|
| 9,202,194 B1 | 12/2015 | Mistry |
| 9,256,852 B1 | 2/2016 | Myllymaki |
| 10,303,171 B1 | 5/2019 | Brady et al. |
| 2008/0177636 A1 | 7/2008 | Yoshida et al. |
| 2014/0180914 A1 | 6/2014 | Abhyanker |
| 2015/0006005 A1* | 1/2015 | Yu .......................... G06Q 50/28 701/22 |
| 2017/0132634 A1 | 5/2017 | James |

(Continued)

FOREIGN PATENT DOCUMENTS

JP    2019131361 A  *  8/2019  ............. B60P 3/007

OTHER PUBLICATIONS

Office Action dated Jan. 3, 2022, for related U.S. Appl. No. 17/141,163 pp. 1-22.

(Continued)

*Primary Examiner* — Yong Hang Jiang
(74) *Attorney, Agent, or Firm* — HEA Law PLLC

(57) ABSTRACT

In order to reduce a burden of receiving a package for a recipient, provided is a package delivery method including: receiving, by a first unmanned delivery vehicle, authentication information input by a user; and unlocking, by a second unmanned delivery vehicle, a key of a storage of the second unmanned delivery vehicle, which stores a package addressed to the user, based on the authentication information received by the first unmanned delivery vehicle.

10 Claims, 16 Drawing Sheets

(56) References Cited

U.S. PATENT DOCUMENTS

| | | |
|---|---|---|
| 2017/0289172 A1 | 10/2017 | Turakhia |
| 2018/0068253 A1* | 3/2018 | Simms ................. G05D 1/0285 |
| 2018/0075688 A1* | 3/2018 | Liu ..................... G06Q 10/083 |
| 2019/0034858 A1* | 1/2019 | Ferguson ............ G07F 17/0057 |
| 2019/0202405 A1 | 7/2019 | Sakurada et al. |
| 2019/0205966 A1 | 7/2019 | Igata et al. |
| 2019/0206170 A1* | 7/2019 | Sakurada ........... G07C 9/00896 |
| 2019/0226245 A1* | 7/2019 | Fabre .................. B60R 25/403 |

OTHER PUBLICATIONS

Office Action dated May 10, 2022, for related U.S. Appl. No. 17/141,163 pp. 1-25.

\* cited by examiner

PACKAGE DELIVERY METHOD, PACKAGE DELIVERY SYSTEM AND DELIVERY MANAGEMENT DEVICE

CROSS REFERENCE TO RELATED APPLICATIONS

This application is a National Stage of International Application No. PCT/JP2019/046007 filed on Nov. 25, 2019. The contents of the above document is incorporated herein by reference in its entirety.

TECHNICAL FIELD

The present invention relates to a package delivery method, a package delivery system, and a package delivery device.

BACKGROUD ART

An unmanned ground vehicle (UGV) enables delivery of a package from a delivery base to a delivery destination, for example, a house. When the UGV has arrived at the delivery destination, the UGV authenticates a recipient of the package, and unlocks a key of a storage storing the package.

In Japanese Patent Application Laid-open No. 2018-58656, there is described a configuration in which a user inputs an authentication key at the time of receiving a package stored inside a side door of an unmanned delivery vehicle, and the unmanned delivery vehicle opens the door of a space storing the package addressed to the user when determining that a recorded delivery instruction and the input user authentication keymatch each other.

SUMMARY OF INVENTION

Technical Problem

When unmanned delivery of a package becomes prevalent, a plurality of UGVs may deliver packages to, for example, an apartment building, and the plurality of UGVs may wait for arrival of recipients. In this case, each recipient is required to find out a UGV storing his or her package, and then perform an authentication operation. However, it is difficult for the recipient to find out a UGV for which the recipient is to perform an authentication operation, and thus there is a fear in that the recipient bears a burden of repeatedly performing authentication operations for the plurality of UGVs, for example.

The present invention has been made in view of the above-mentioned problem, and has an object to provide a technology of reducing a burden of receiving a package for a recipient.

Solution to Problem

In order to solve the above-mentioned problem, according to one embodiment of the present invention, there is provided a package delivery method including: receiving, by a first unmanned delivery vehicle, authentication information input by a user;

and unlocking, by a second unmanned delivery vehicle, a key of a storage of the second unmanned delivery vehicle, which stores a package addressed to the user, based on the authentication information received by the first unmanned delivery vehicle.

According to one embodiment of the present invention, there is provided a package delivery system including: a first unmanned delivery vehicle including reception means for receiving authentication information input by a user; and a second unmanned delivery vehicle including unlocking means for unlocking a key of a storage of the second unmanned delivery vehicle, which stores a package addressed to the user, based on the authentication information received by the first unmanned delivery vehicle.

According to one embodiment of the present invention, there is provided a delivery management device including: authentication means for acquiring authentication information input by a user to a first unmanned delivery vehicle and authenticating the user based on the authentication information;

and unlocking instruction means for transmitting, to the second unmanned delivery vehicle, an instruction to unlock a key of a storage storing a package addressed to the user when the package addressed to the user is stored in the second unmanned delivery vehicle.

Further, according to one aspect of the present invention, the package delivery method may further include: authenticating, by a server, when receiving the authentication information from the first unmanned delivery vehicle, the user based on the received authentication information; and transmitting, by the server, to the second unmanned delivery vehicle, an instruction to unlock the key of the storage storing the package addressed to the user when the package addressed to the user is stored in the second unmanned delivery vehicle.

Further, according to one aspect of the present invention, the package delivery method may further include the step of authenticating, when the second unmanned delivery vehicle has received the authentication information from the first unmanned delivery vehicle and the package addressed to the user is stored in the second unmanned delivery vehicle, the user who has input the received authentication information, and the step of unlocking may include unlocking, by the second unmanned delivery vehicle, the key of the storage storing the package addressed to the user when the user is authenticated.

Further, according to one aspect of the present invention, the package delivery method may further include: authenticating, by the first unmanned delivery vehicle, the user based on the authentication information; and transmitting, by the first unmanned delivery vehicle, to the second unmanned delivery vehicle, an instruction to unlock the key of the storage storing the package addressed to the user when the package addressed to the user is stored in the second unmanned delivery vehicle.

Further, according to one aspect of the present invention, the package delivery method may further include: transmitting, by a server, the authentication information to the user; and transmitting, by the server, to the first unmanned delivery vehicle, determination information for determining whether the authentication information for authenticating the user is appropriate, and the step of authenticating the user may include authenticating, by the first unmanned delivery vehicle, the user based on the authentication information and the determination information.

Further, according to one aspect of the present invention, the package delivery method may further include: authenticating, by a server, when receiving the authentication information from the first unmanned delivery vehicle, the user who has input the received authentication information; and transmitting, by the first unmanned delivery vehicle, to the second unmanned delivery vehicle, an instruction to unlock the key of the storage storing the package addressed to the user when the user is authenticated and the package addressed to the user is stored in the second unmanned delivery vehicle.

Further, according to one aspect of the present invention, the package delivery method may further include the step of transmitting, by the server, the authentication information to the user.

Further, according to one aspect of the present invention, the first unmanned delivery vehicle includes a storage, a periphery of each of the first and second unmanned delivery vehicles includes a first surface on which a door of the storage is arranged, a second surface, which faces a direction different from a direction of the first surface, and on which a device for inputting the authentication information is arranged, and a third surface opposed to the second surface, and the package delivery method may further include the step of moving at least one of the first unmanned delivery vehicle or the second unmanned delivery vehicle so that the second surface of one of the first unmanned delivery vehicle and the second unmanned delivery vehicle is adjacent to the third surface of another of the first unmanned delivery vehicle and the second unmanned delivery vehicle.

Advantageous Effects of Invention

According to the present invention, it is possible to reduce the burden of receiving the package for the recipient.

DESCRIPTION OF EMBODIMENTS

Now, description is made of embodiments of the present invention with reference to the drawings. A redundant description of components denoted by the same reference symbols is omitted. In this embodiment, description is made of a package delivery system that uses a plurality of unmanned delivery vehicles to deliver packages to an apartment building in which a plurality of users live.

First Embodiment

Figure 1:
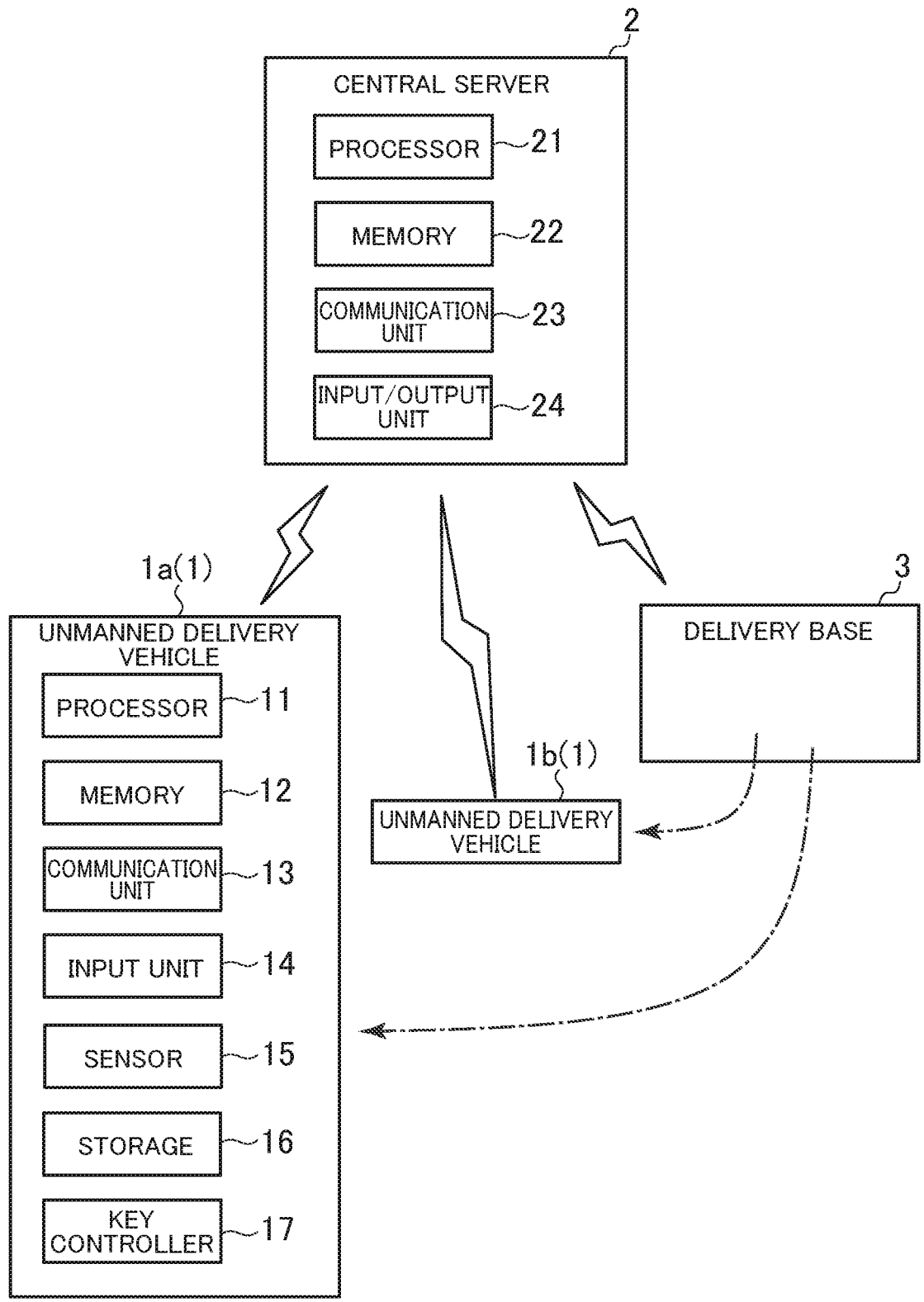
FIG. 1 is a diagram for illustrating an example of a configuration of a delivery system according to a first embodiment of the present invention.

FIG. 1 is a diagram for illustrating an example of a configuration of a delivery system according to a first embodiment of the present invention. As illustrated in FIG. 1, the package delivery system includes a plurality of unmanned delivery vehicles 1, a central server 2, and a delivery base 3.

The unmanned delivery vehicle 1 is a machine configured to travel on the ground to deliver a package under automatic control without accommodating a driver. The unmanned delivery vehicle 1 is called "unmanned ground vehicle (UGV)". In FIG. 1, two unmanned delivery vehicles 1a and 1b are illustrated, but the number of unmanned delivery vehicles 1 maybe three or more. The unmanned delivery vehicle 1 is communicably connected to the central server 2 via wireless communication. The wireless communication may be based on a communication standard, for example, Long Term Evolution (LTE).

The central server 2 is configured to communicate to/from the plurality of unmanned delivery vehicles 1 and the delivery base 3 to manage those operations. The delivery base 3 includes a warehouse storing packages to be delivered to users, and in the delivery base 3, for example, an employee of the delivery base 3 stores a package addressed to a user in the unmanned delivery vehicle 1 based on an instruction from the central server 2. The plurality of unmanned delivery vehicles 1 are placed in the delivery base 3, and the unmanned delivery vehicle 1 delivers a package to a delivery destination from the delivery base 3.

Figure 2:
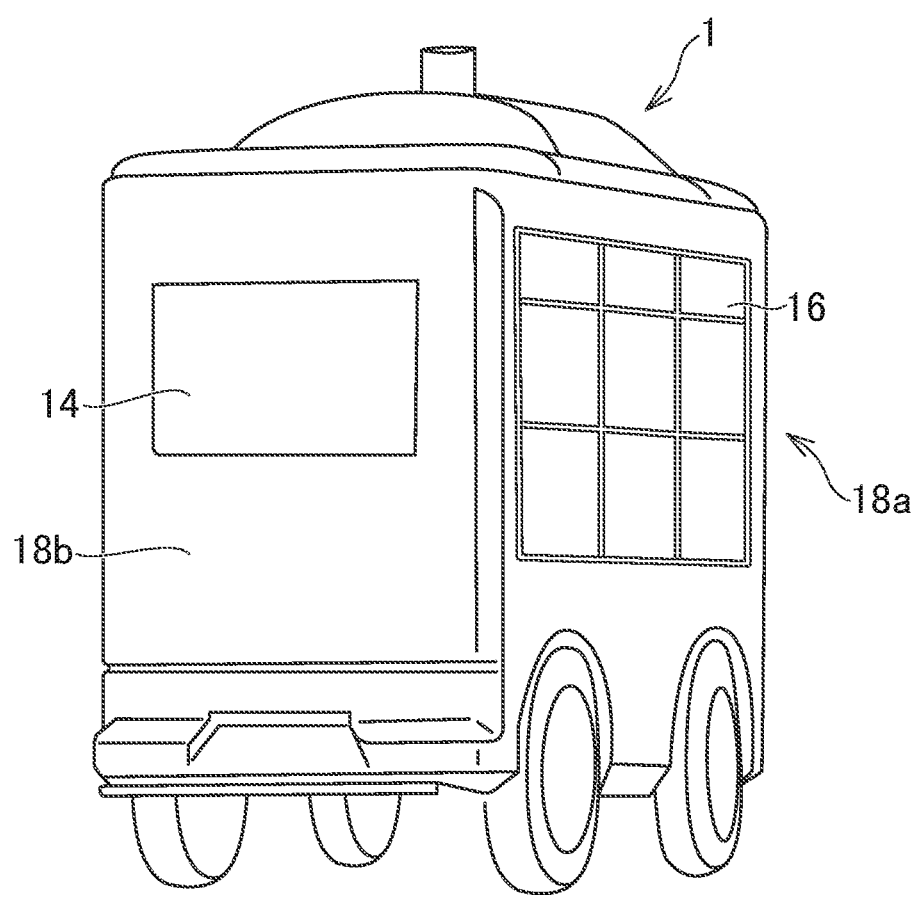
FIG. 2 is a perspective view of an example of an unmanned delivery vehicle.

FIG. 2 is a perspective view of an example of the unmanned delivery vehicle 1. As illustrated in FIG. 1 and FIG. 2, the unmanned delivery vehicle 1 includes a processor 11, a memory 12, a communication unit 13, an input/output unit 14, a sensor 15, a plurality of storages 16, a key controller 17, and a drive unit (not shown).

The processor 11 is configured to execute processing in accordance with a program or data stored in the memory 12. Further, the processor 11 is configured to control the communication unit 13, the input/output unit 14, the sensor 15, and the key controller 17.

The memory 12 includes a volatile memory, for example, a RAM, and a non-volatile memory, for example, a flash memory. The memory 12 may further include a storage device, for example, a hard disk drive. The memory 12 stores the above-mentioned program. Further, the memory 12 stores calculation results and information, which are input from the processor 11, the communication unit 13, and the input/output unit 14. The above-mentioned program may be provided through, for example, the Internet, or may be stored in a storage medium capable of being read by a computer, for example, a flash memory, and provided.

The communication unit 13 includes, for example, an integrated circuit implementing a communication interface for wireless communication. The communication unit 13 is configured to input, based on control by the processor 11, information received from other apparatus to the processor 11 or the memory 12, and transmit the information to the other apparatus.

The input/output unit 14 includes a display output device, an input device, and interfaces with those devices. Specifically, the input/output unit 14 is a touch panel with a display (hereinafter referred to as "input panel"), and is used for inputting a reception code for authentication. The input/output unit 14 may be a display and a physical button, or may be other types of the display output device and input device. The input/output unit 14 is configured to display, based on control by the processor 11, an image on the display output device to acquire data input by the user on the input device.

The sensor 15 includes a lidar and a camera configured to recognize the size and position of a peripheral obstacle. The plurality of storages 16 are regions for storing packages. A plurality of storages 16 are provided on respective side surface of the unmanned delivery vehicle 1. Each storage 16 has a door, and a key is set on the door. The key controller 17 is a circuit configured to electrically control locking or unlocking of the key of the door. In the storage 16, as a part of the sensor 15, a sensor configured to detect presence/absence of a package in the storage 16 is arranged.

The unmanned delivery vehicle 1 includes, on its periphery, aside surface on which the doors of the storages 16 are arranged, an end portion 18b being a surface which faces in a direction different from that of the side surface and on which the input/output unit 14 is arranged, and an end portion 18a being a surface opposed to the end portion 18b. The lidar is provided on a top surface of the unmanned delivery vehicle 1, and a camera (not shown) is arranged on the end portion 18a.

The central server 2 includes a processor 21, a memory 22, a communication unit 23, and an input/output unit 24. The central server 2 may be one physical server, or may include a plurality of physical servers like a so-called cloud computing system.

The processor 21 is configured to execute processing in accordance with a program or data stored in the memory 22. Further, the processor 21 is configured to control the communication unit 23 and the input/output unit 24.

The memory 22 includes a volatile memory, for example, a RAM, and a non-volatile memory, for example, a flash memory. The memory 22 stores the above-mentioned program. Further, the memory 22 stores information or calculation results, which are input from the processor 21, the communication unit 23, and the input/output unit 24. The above-mentioned program may be provided through, for example, the Internet, or may be stored in a storage medium capable of being read by a computer, for example, a flash memory, and provided.

The communication unit 23 includes, for example, an integrated circuit implementing a communication interface for wired communication. The communication unit 23 is configured to input, based on control by the processor 21, information received from other apparatus to the processor 21 or the memory 22, and transmit the information to the other apparatus. The communication unit 23 may communicate to/from the unmanned delivery vehicle 1 via a communication network and a wireless communication device included in the communication network.

The input/output unit 24 includes a video controller configured to control display, and a controller configured to acquire data from an input device. The input device includes, for example, a touch panel, a keyboard, or a mouse. The input/output unit 24 is configured to output, based on control by the processor 21, display data to the display output device, and acquire data input by the user through operation of the input device.

Figure 3:
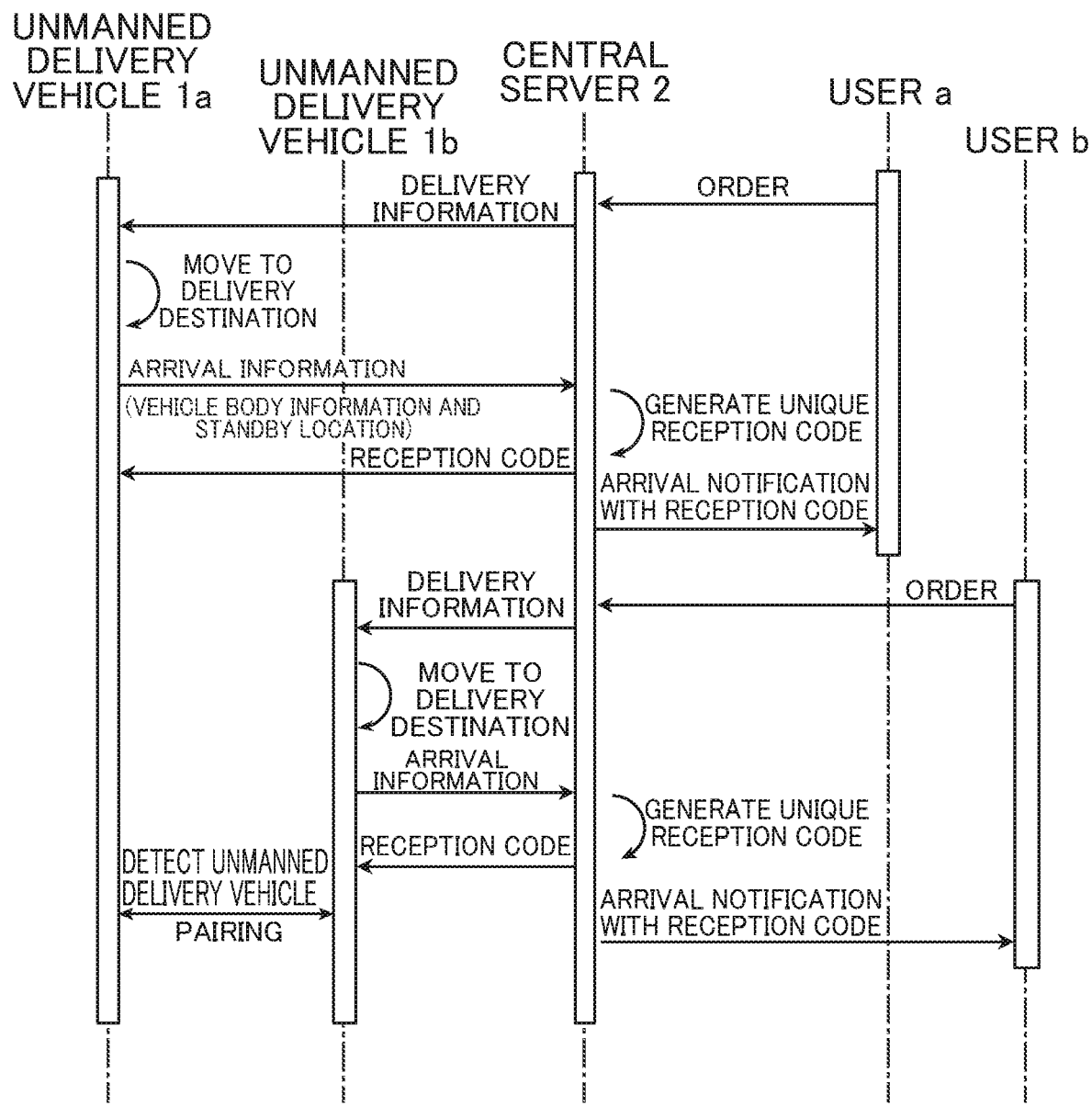
FIG. 3 is a sequence diagram for illustrating an operation of the delivery system.
Figure 4:
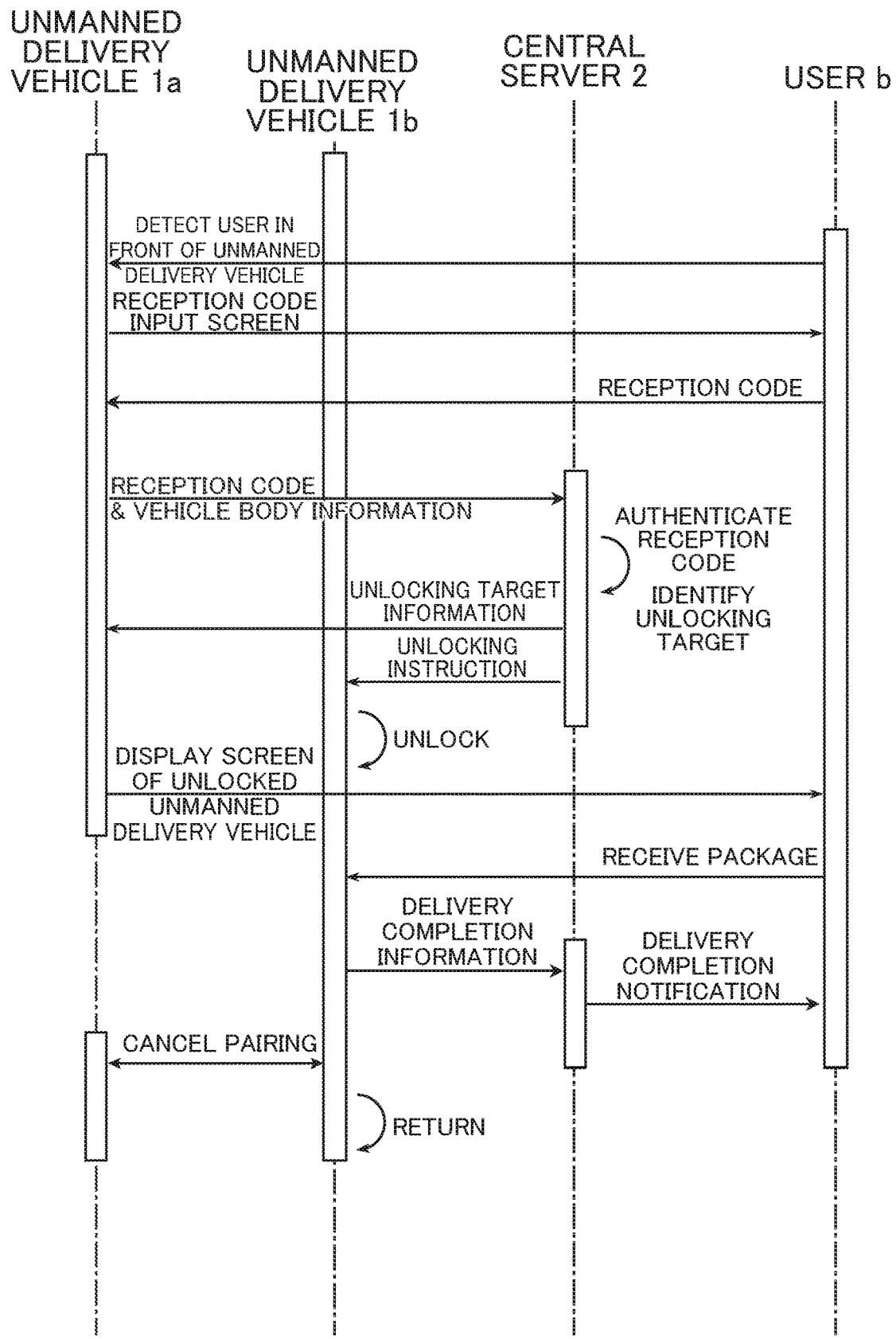
FIG. 4 is a sequence diagram for illustrating an operation of the delivery system.

Next, description is made of delivery of a package by the package delivery system. FIG. 3 and FIG. 4 are each a sequence diagram for illustrating an operation of the delivery system. FIG. 3 is mainly an illustration of an operation until the plurality of unmanned delivery vehicles 1a and 1b have arrived at a standby location of the delivery destination and started to wait. FIG. 4 is mainly an illustration of an operation since the user has arrived until delivery of a package has finished. Those sequence diagrams relate to a case in which a plurality of packages addressed to a plurality of users "a" and "b" are delivered to the same delivery destination (apartment building) by the plurality of unmanned delivery vehicles 1a and 1b, and the unmanned delivery vehicle 1a delivers a package addressed to the user "a", and the unmanned delivery vehicle 1b delivers a package addressed to the user "b".

First, the user "a" orders a product from the central server 2, and in order to deliver a package including the ordered product to the user "a", the central server 2 transmits, to the unmanned delivery vehicle 1a, an instruction (delivery information) to deliver the package to the delivery destination. The central server 2 transmits, to the delivery base 3, an instruction to store the package in the unmanned delivery vehicle 1a, and a staff member of the delivery base 3 stores the package in the storage 16 of the unmanned delivery vehicle 1a. Next, the unmanned delivery vehicle 1a moves to the delivery destination (e.g., entrance of apartment building), and when the unmanned delivery vehicle 1a has arrived at the standby location of the delivery destination, the unmanned delivery vehicle 1a transmits arrival information to the central server 2. The arrival information includes vehicle body information for identifying the unmanned delivery vehicle 1 and information indicating the standby location.

When the central server 2 has received the arrival information, the central server 2 generates a unique reception code, transmits the generated reception code to the unmanned delivery vehicle 1a, and further transmits an arrival notification including the reception code to the user "a" (more strictly, device owned by user "a"). The reception code to be transmitted to the user is, for example, a PIN code or data with a larger amount of information. The PIN code may be a six-digit number or alphanumeric characters, or QR code (trademark) image data obtained by encoding the reception code may be transmitted.

The unmanned delivery vehicle 1a receives the reception code, and waits at the standby location. The user "b" and the unmanned delivery vehicle 1b also perform an operation from placement of an order to transmission of an arrival notification. Now, for example, it is assumed that the unmanned delivery vehicles 1a and 1b wait at the same standby location because, for example, the users "a" and "b" live in the same apartment building. Then, when each of the unmanned delivery vehicles 1a and 1b has detected another unmanned delivery vehicle 1 that is close to the own unmanned delivery vehicle (unmanned delivery vehicle 1b or 1a in this case) and the other unmanned delivery vehicle 1 is detected, the unmanned delivery vehicles 1a and 1b communicate to/from each other to exchange vehicle body information for identifying the unmanned delivery vehicles 1. In the following, operations of connecting to another unmanned delivery vehicle 1 through communication and exchanging vehicle body information with the other unmanned delivery vehicle 1 are referred to as "pairing".

After that, when the user "a" has approached the unmanned delivery vehicles 1a and 1b, the unmanned delivery vehicle 1a detects the fact that the user has approached, and displays a reception code input screen on the display. In this example, it is assumed that the user can operate only the input/output unit 14 of the unmanned delivery vehicle 1a. When the user "b" has input a reception code to the input/output unit 14 of the unmanned delivery vehicle 1a, the unmanned delivery vehicle 1a transmits, to the central server 2, the reception code and vehicle body information for identifying the own unmanned delivery vehicle 1a.

The central server 2, which has received the reception code and vehicle body information, confirms whether the reception code is appropriate, and authenticates the user "b", who has input the reception code. Then, the central server 2 identifies the unmanned delivery vehicle 1b and the storage 16 (unlocking target), which stores a package addressed to the user "b". When the unlocking target is identified, the central server 2 transmits, to the unmanned delivery vehicle 1b being the unlocking target, an unlocking instruction to unlock the key of the door of the identified storage 16, and the unmanned delivery vehicle 1b unlocks the key of the storage 16. Further, the central server 2 transmits information (unlocking target information) indicating the unlocking target to the unmanned delivery vehicle 1a to which the reception code has been input, and the unmanned delivery vehicle 1a displays the unlocked unmanned delivery vehicle 1b on the display.

The user "b" recognizes the fact that a package is stored in the unmanned delivery vehicle 1b through display on the display and a behavior of the door of the storage 16, and receives a package stored in the unlocked storage 16. When the unmanned delivery vehicle 1b has detected the fact that the user "b" has received the package, the unmanned delivery vehicle 1b transmits, to the central server 2, delivery completion information indicating completion of delivery, and the central server 2 transmits a delivery completion notification to the user "b". After that, the unmanned delivery vehicle 1b cancels the communication connection (pairing) to the unmanned delivery vehicle 1a, and returns to the delivery base 3.

Figure 5:
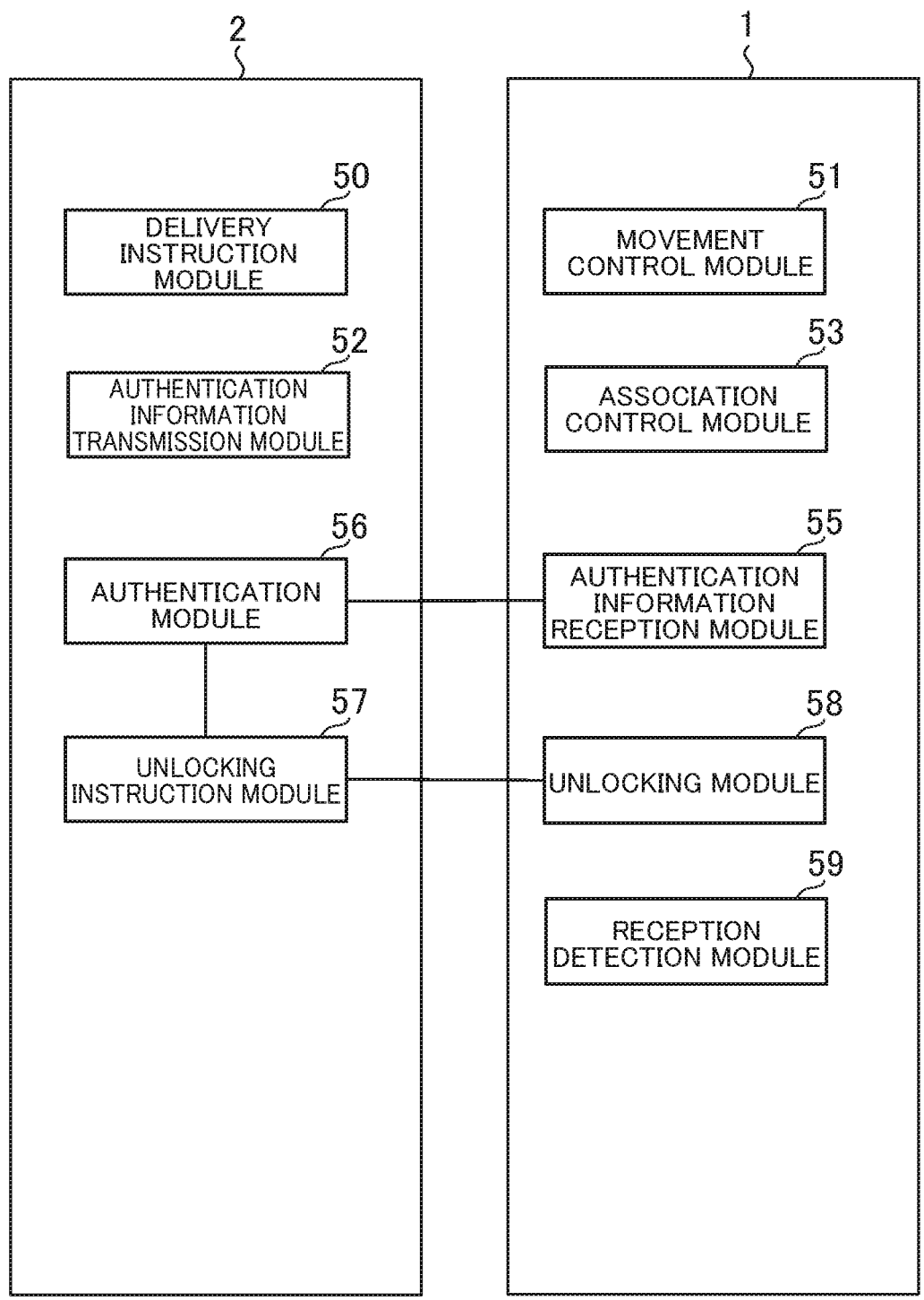
FIG. 5 is a block diagram for illustrating functions to be implemented by the delivery system.

Now, description is made of processing of the delivery system more in detail. FIG. 5 is a block diagram for illustrating functions to be implemented by the delivery system. In the first embodiment, the package delivery system includes, from the functional point of view, a delivery instruction module 50, a movement control module 51, an authentication information transmission module 52, an association control module 53, an authentication information reception module 55, an authentication module 56, an unlocking instruction module 57, an unlocking module 58, and a reception detection module 59. The delivery instruction module 50, the authentication information transmission module 52, the authentication module 56, and the unlocking instruction module 57 are implemented by the processor 21 included in the central server 2 executing programs stored in the memory 22 to control the communication unit 23. Those functions may be implemented by the processors 21 included in the plurality of serves executing programs. The movement control module 51, the association control module 53, the authentication information reception module 55, the unlocking module 58, and the reception detection module 59 are implemented by the processor 11 included in the unmanned delivery vehicle 1 executing programs stored in the memory 12 to control the communication unit 13, the input/output unit 14, the sensor 15, and the key controller 17.

The delivery instruction module 50 of the central server 2 is configured to instruct the delivery base 3 and the unmanned delivery vehicle 1 to deliver a package addressed to the user. More specifically, when a package (package addressed to user) including a product ordered from the user is in the delivery base 3, the delivery instruction module 50 transmits, to the delivery base 3, an instruction to store the package addressed to the user in the storage 16 of the unmanned delivery vehicle 1, and further transmits, to the unmanned delivery vehicle 1, an instruction (delivery information) to deliver the package to the delivery destination of that user.

The movement control module 51 of the unmanned delivery vehicle 1 is configured to control, based on data acquired by the lidar or a GPS sensor of the unmanned delivery vehicle 1, movement of the unmanned delivery vehicle 1 from the delivery base 3 to the delivery destination and movement of the unmanned delivery vehicle 1 from the delivery destination to the delivery base 3. The movement control module 51 may be configured to control movement based on the data acquired by the camera. A part of functions of the movement control module 51 may be implemented by a server computer. Further, when there is another unmanned delivery vehicle 1 in an area of the delivery destination to wait for the user, the movement control module 51 controls at least one of the two unmanned delivery vehicles 1 to move so that one end portion 18b (surface including input/output unit 14) and the other end portion 18b are adjacent to each other among the two unmanned delivery vehicles 1. Details thereof are described later. When the unmanned delivery vehicle 1 has arrived at the standby location of the delivery destination, the movement control module 51 transmits arrival information to the central server 2.

The authentication information transmission module 52 of the central server 2 is configured to generate a reception code when the unmanned delivery vehicle 1 has arrived at the standby location of the delivery destination, and the authentication information transmission module 52 has received the arrival information notifying of arrival from the unmanned delivery vehicle 1. The reception code is authentication information to be input from the user for authentication when the user receives a package. The authentication information transmission module 52 transmits the generated reception code to the user (more strictly, device owned by user). Further, the authentication information transmission module 52 transmits the generated reception code to the unmanned delivery vehicle 1.

The association control module 53 of the unmanned delivery vehicle 1 is configured to receive the reception code from the authentication information transmission module 52 of the central server 2 via the communication unit 13, and store the reception code into the memory 12. Further, the association control module 53 detects whether there is another unmanned delivery vehicle 1 in an area of the delivery destination at which the user is waiting, and when existence of another unmanned delivery vehicle 1 is detected, the association control module 53 connects to the unmanned delivery vehicle 1 through communication, and exchanges vehicle body information for identifying the unmanned delivery vehicle 1. In the following, operations of connecting to another unmanned delivery vehicle 1 through communication and exchanging vehicle body information with the unmanned delivery vehicle 1 are referred to as "pairing".

The authentication information reception module 55 of the unmanned delivery vehicle 1 is configured to receive the reception code input from the user through the input/output unit 14. Further, the authentication information reception module 55 is configured to transmit the received reception code to the central server 2.

The authentication module 56 of the central server 2 is configured to receive the reception code from the unmanned delivery vehicle 1, and authenticate the user based on the reception code.

The unlocking instruction module 57 of the central server 2 is configured to transmit, to the unmanned delivery vehicle 1 storing a package addressed to the authenticated user, an instruction (unlocking instruction) to unlock the key (more strictly, key of door of storage 16) of the storage 16 storing the package addressed to the user. When the unmanned delivery vehicle 1 (e.g., unmanned delivery vehicle 1a) to which the user has input the reception code and the unmanned delivery vehicle (e.g., unmanned delivery vehicle 1b) storing the package addressed to the user are different from each other, the unlocking instruction module 57 is configured to transmit an unlocking instruction to the unmanned delivery vehicle 1 (e.g., unmanned delivery vehicle 1b) storing the package addressed to the user. The unlocking instruction module 57 may be configured to directly transmit an unlocking instruction to the unmanned delivery vehicle 1b storing the package addressed to the user, or may be configured to transmit an unlocking instruction to the unmanned delivery vehicle 1b via the unmanned delivery vehicle 1a to which the user has input the reception code.

The unlocking module 58 of the unmanned delivery vehicle 1 is configured to receive the unlocking instruction, and unlock the key of the storage 16 storing the package addressed to the user based on the unlocking instruction.

The reception detection module 59 of the unmanned delivery vehicle 1 is configured to detect whether a package in the storage 16 is removed (which means whether user has received package) based on output of the sensor 15. The reception detection module 59 may be configured to detect whether the user has received the package based on whether the door of the storage 16 is closed.

When the reception detection module 59 has detected the fact that the user has received the package, the reception detection module 59 transmits, to the central server 2, delivery completion information indicating completion of delivery of the package to the user.

Figure 6:
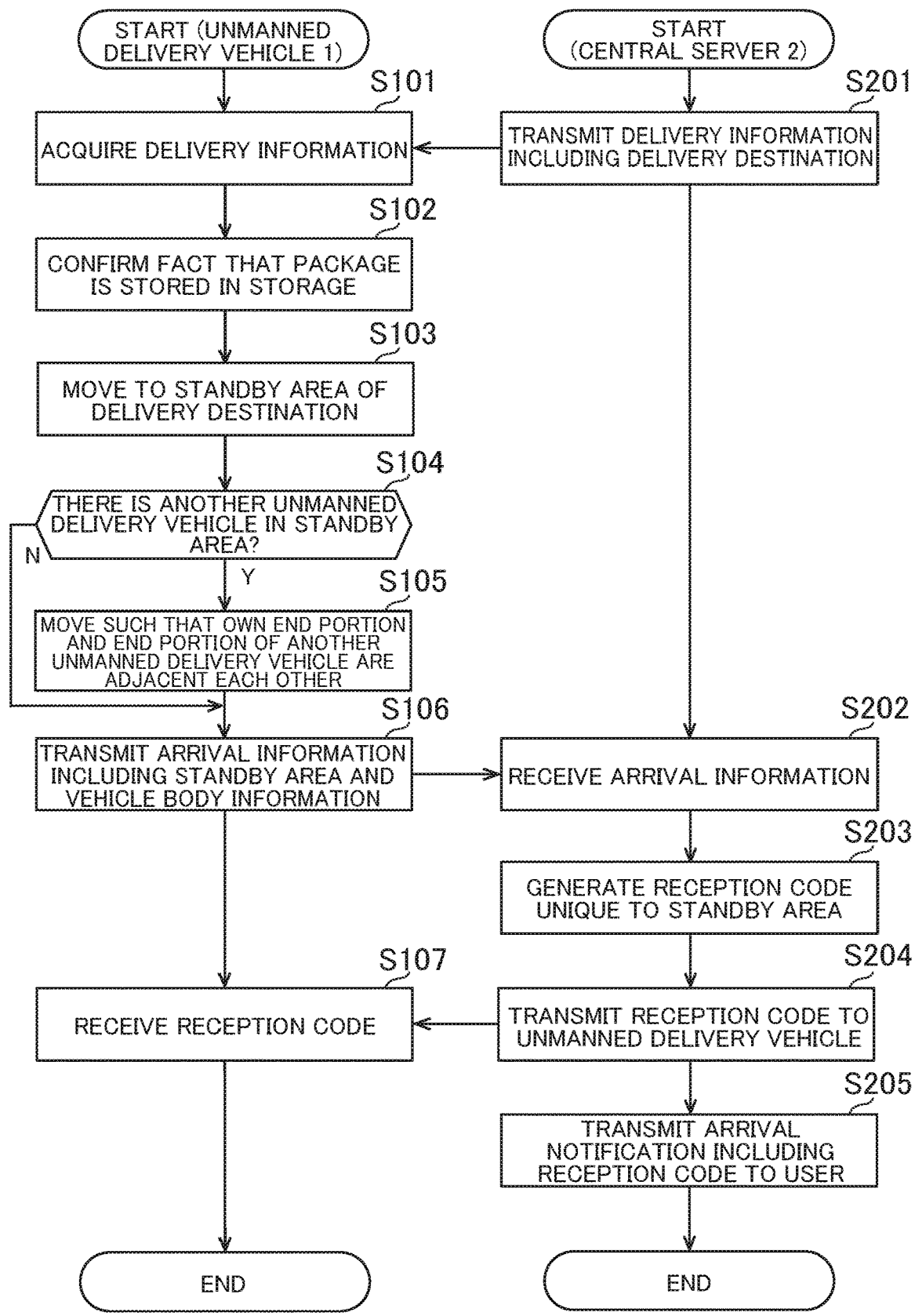
FIG. 6 is a flow chart for illustrating an example of processing to be executed by an unmanned delivery vehicle and a central server at a time when the unmanned delivery vehicle goes to a delivery destination.

FIG. 6 is a flow chart for illustrating an example of processing to be executed by the unmanned delivery vehicle 1 going to the delivery destination and the central server 2, and the processing illustrated in FIG. 6 is executed for each of the two unmanned delivery vehicles 1 illustrated in the sequence diagram of FIG. 3.

First, the delivery instruction module 50 of the central server 2 transmits delivery information including the delivery destination to the unmanned delivery vehicle 1 (Step S201). The delivery instruction module 50 stores, into the memory 22, a user, a package, and the unmanned delivery vehicle 1 storing the package in association with one another. The movement control module 51 of the unmanned delivery vehicle 1 acquires the delivery information (Step S101). Further, the movement control module 51 of the unmanned delivery vehicle 1 confirms the fact that a package indicated by the delivery instruction is stored in the storage 16 at the delivery base 3 (Step S102), and moves to a standby area (e.g., entrance of apartment building of delivery destination) of the delivery destination (Step S103). A publicly known technology, such as unmanned driving or automatic delivery, may be used for control of movement, and a detailed description of the control is omitted.

When the unmanned delivery vehicle 1 has approached or arrived at the standby area of the delivery destination, the movement control module 51 determines whether there is another unmanned delivery vehicle 1 in the standby area (Step S104). When there is another unmanned delivery vehicle 1 (Y in Step S104), the movement control module 51 controls movement of the unmanned delivery vehicle 1 such that the end portion 18b of the own unmanned delivery vehicle 1 (surface of input/output unit 14) and the end portion 18a (surface on which there are no input/output unit 14 and doors of storage 16) of another unmanned delivery vehicle 1 are adjacent to each other (Step S105). When there is no other unmanned delivery vehicle 1 (N in Step S104), the movement control module 51 skips Step S105, and is configured to move the unmanned delivery vehicle 1 to a place of the standby area at which the unmanned delivery vehicle 1 can wait.

Figure 7:
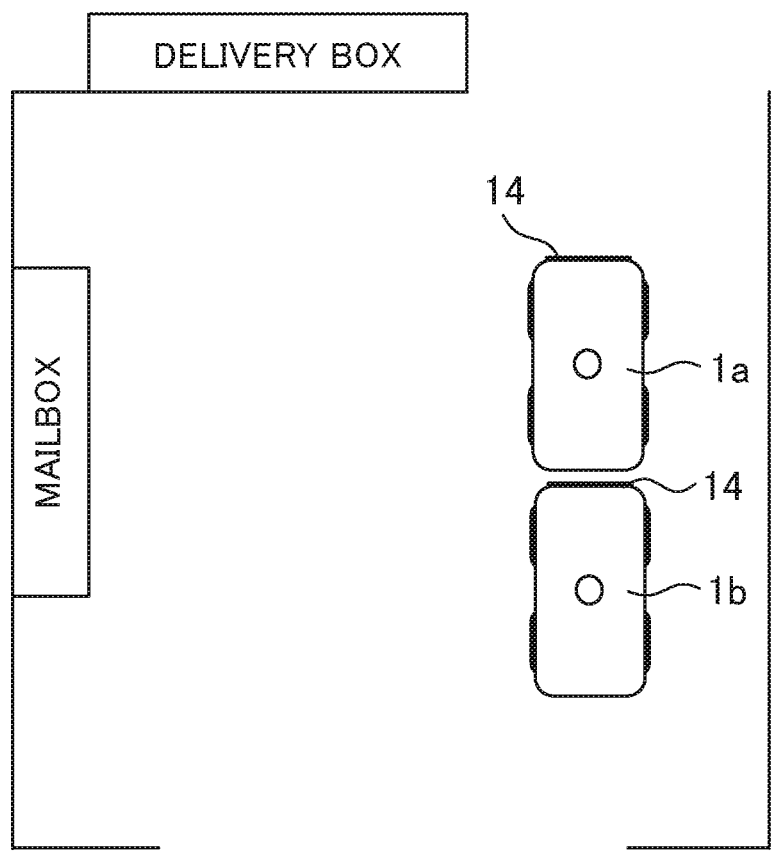
FIG. 7 is a diagram for illustrating an example of arrangement of a plurality of unmanned delivery vehicles at the delivery destination.

FIG. 7 is a diagram for illustrating an example of arrangement of the plurality of unmanned delivery vehicles 1 at the delivery destination, which is an illustration of arrangement of the plurality of unmanned delivery vehicles 1a and 1b as viewed from the above. In the example of FIG. 7, the end portion 18a (surface on which there are no input/output unit 14 and doors of storage 16) of the unmanned delivery vehicle 1a is adjacent to the end portion 18b (surface of input/output unit 14) of the unmanned delivery vehicle 1b. The unmanned delivery vehicle 1a has arrived first at the standby area, and the unmanned delivery vehicle 1b has arrived later. The movement control module 51 of the unmanned delivery vehicle 1b which has arrived later, causes the unmanned delivery vehicle 1b to move so that the end portion 18a of the unmanned delivery vehicle 1a is adjacent to the own end portion 18b. In the state illustrated in FIG. 7, the user can input information only to the input/output unit 14 of the unmanned delivery vehicle 1a physically. With this, the user can easily recognize the unmanned delivery vehicle 1 to which the reception code is to be input, and can prevent the user from having a difficulty in choosing which unmanned delivery vehicle 1 is to be operated when there are a plurality of unmanned delivery vehicles 1 in the standby area.

When the unmanned delivery vehicle 1 has finished movement, the movement control module 51 transmits, to the central server 2, arrival information including the standby area of the delivery destination and the vehicle body information (Step S106). The authentication information transmission module 52 of the central server 2 receives the arrival information (Step S202), and generates a reception code that is unique in at least the standby area of the delivery destination based on the received arrival information (Step S203). The authentication information transmission module 52 generates a reception code that does not overlap with another reception code generated for another user in at least the standby area. The authentication information transmission module 52 may generate a reception code that does not overlap with reception codes issued for the unmanned delivery vehicles 1 waiting at all the other standby areas, or may generate a reception code that does not overlap with a reception code issued for the unmanned delivery vehicle 1 waiting at another nearby standby area. The reception code is information that can authenticate the user even when the reception code is used alone without being used together with information for identifying the user.

When the reception code is generated, the authentication information transmission module 52 transmits the reception code to the unmanned delivery vehicle 1, which has transmitted arrival information (Step S204), and the association control module 53 of the unmanned delivery vehicle 1 receives the reception code (Step S107) to store the received reception code and information for identifying the storage 16 storing the package into the memory 12 in association with each other. In this case, instead of the reception code, information capable of authenticating whether the reception code is appropriate, for example, a hash value of the reception code, may be transmitted and used for subsequent authentication of the user.

Further, the authentication information transmission module 52 transmits an arrival notification including the reception code to the user of the delivery destination (Step S205).

Figure 8:
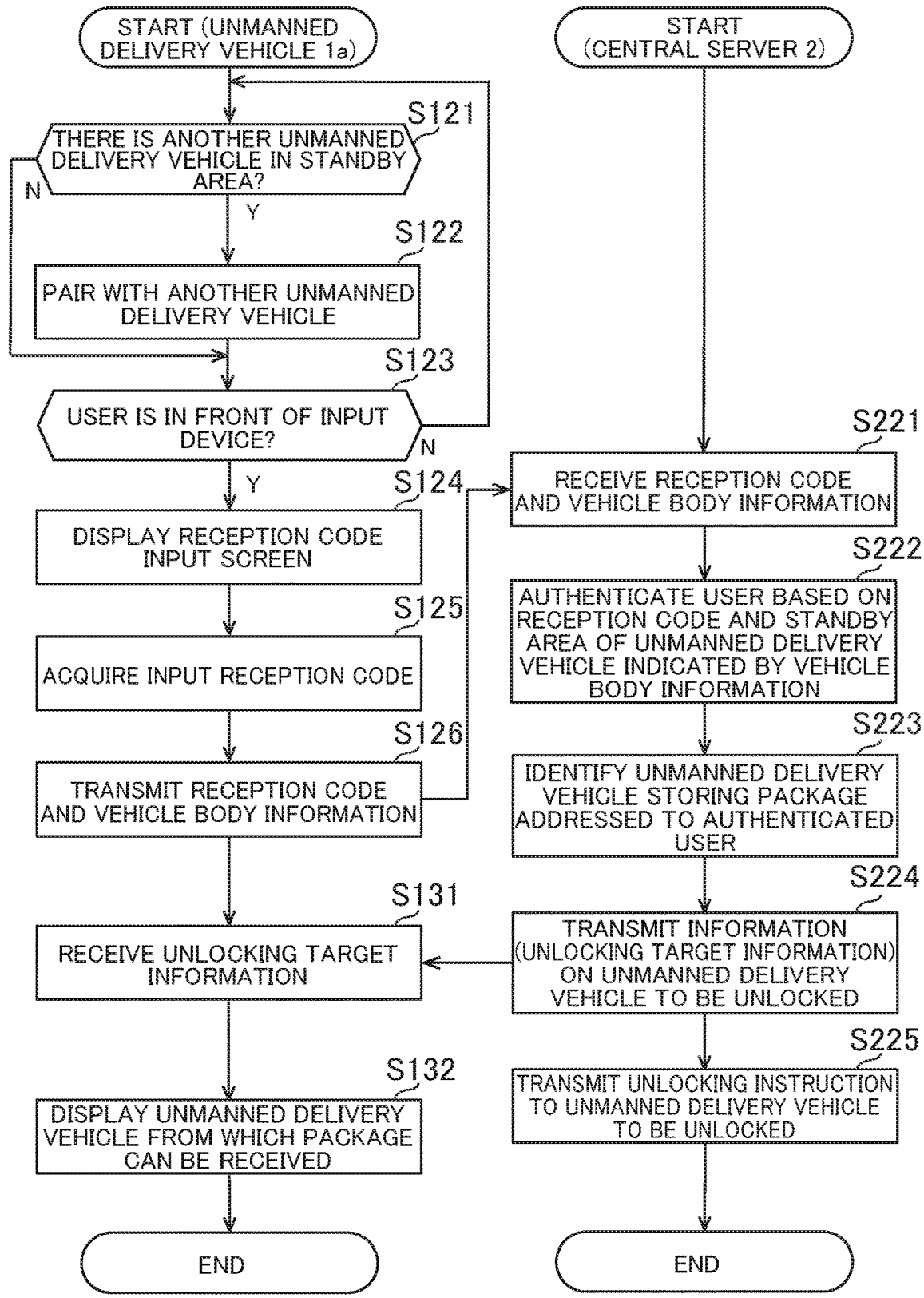
FIG. 8 is a flow chart for illustrating an example of processing to be executed by the unmanned delivery vehicle and the central server after the unmanned delivery vehicle has started to wait at the delivery destination.
Figure 9:
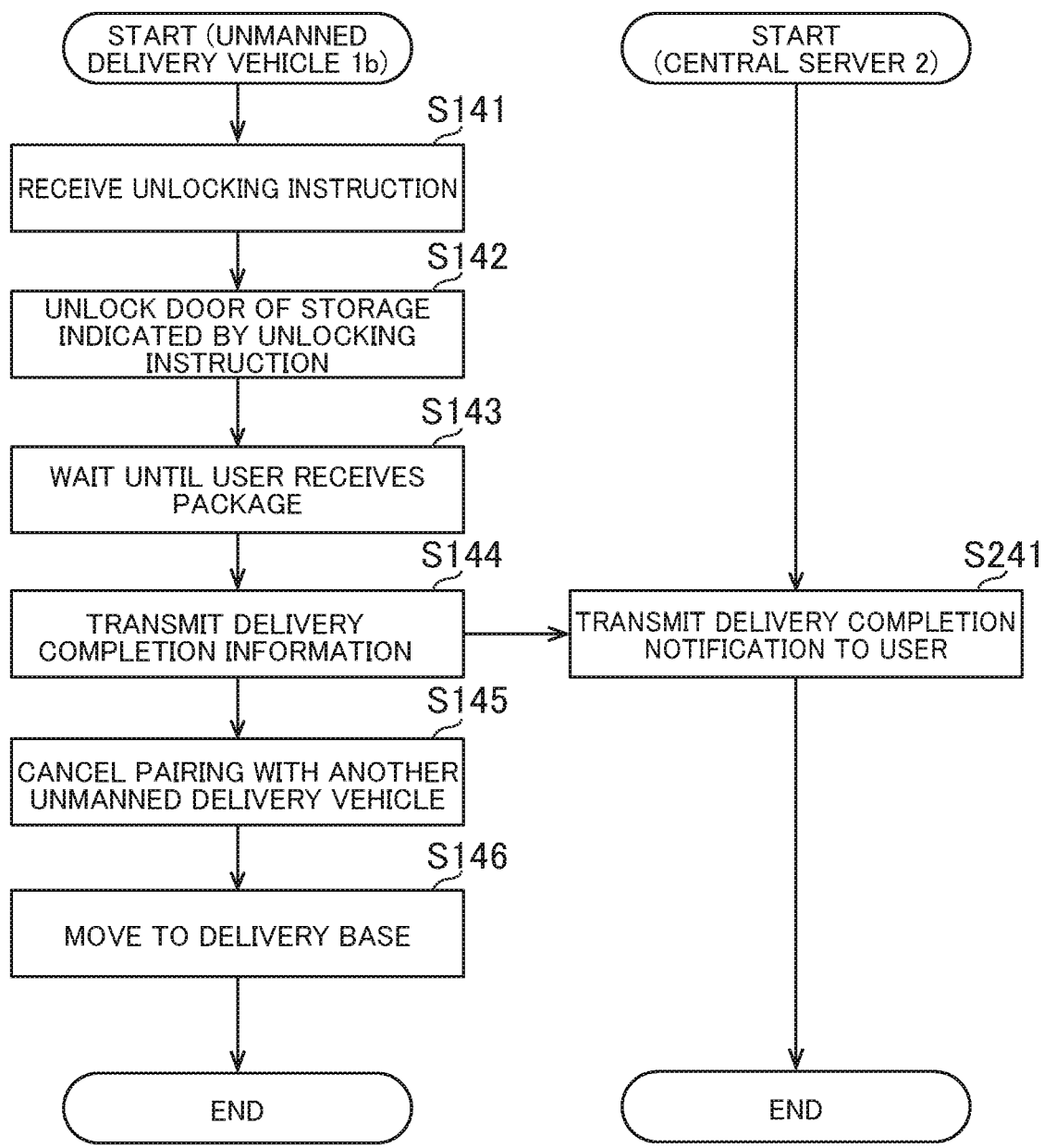
FIG. 9 is a flow chart for illustrating an example of processing to be executed by the unmanned delivery vehicle and the central server after the unmanned delivery vehicle has started to wait at the delivery destination.

FIG. 8 is a flow chart for illustrating an example of processing to be executed by the unmanned delivery vehicle 1 and the central server 2 after the unmanned delivery vehicle 1 has started to wait at the delivery destination. In FIG. 8, processing by the unmanned delivery vehicle 1a and the central server 2 is illustrated. The processing relates to input of the reception code by the user. FIG. 9 is a flow chart for illustrating an example of processing to be executed by the unmanned delivery vehicle 1 and the central server 2 after the unmanned delivery vehicle 1 has started to wait at the delivery destination. In FIG. 9, processing by the unmanned delivery vehicle 1b and the central server 2 is illustrated. The processing relates to unlocking and completion of delivery.

First, the association control module 53 of the unmanned delivery vehicle 1a determines whether there is another unmanned delivery vehicle 1 in the standby area based on the result of detection by the sensor 15, or a vehicle search using the communication unit 13 (Step S121). Then, when there is another unmanned delivery vehicle 1 in the standby area (Y in Step S121), the association control module 53 pairs with the existing another unmanned delivery vehicle 1 (Step S122). When the association control module 53 has already paired with another unmanned delivery vehicle 1, the association control module 53 does not pair with the existing unmanned delivery vehicle 1, or the processing of Step S121 and Step S122 may be executed by the unmanned delivery vehicle 1 other than the unmanned delivery vehicle 1a. On the other hand, when there is no other unmanned delivery vehicle 1 in the standby area (N in Step S121), the association control module 53 skips Step S122. Next, the authentication information reception module 55 determines whether the user is in front of a touch panel of the input/output unit 14 (Step S123). The authentication information reception module 55 may determine whether the user is in front of the input/output unit 14 depending on whether the touch panel has been pressed, or based on the result of detection by an infrared sensor or lidar in the sensor 15. When the user is not in front of the input/output unit 14 (N in Step S123), the processing of from Step S121 is repeated.

When the user is in front of the input/output unit 14 (Y in Step S123), the authentication information reception module 55 displays a reception code input screen on the display of the input/output unit 14 (Step S124). Then, when the user who has recognized the reception code input screen has input a reception code, the authentication information reception module 55 acquires the reception code input on the input/output unit 14 (Step S125). The authentication information reception module 55 may acquire a PIN code input on the touch panel as the reception code, or may acquire, for example, a decoded QR code photographed by a camera included in the input/output unit 14 as the reception code. When the authentication information reception module 55 has acquired the reception code, the authentication information reception module 55 transmits the reception code and the vehicle body information to the central server 2 (Step S126). Instead of the reception code, information (e.g., hash value) obtained by processing the reception code may be transmitted.

The authentication module 56 of the central server 2 receives the reception code and the vehicle body information via the communication unit 23 (Step S221). The authentication module 56 acquires a standby area included in arrival information previously received from the unmanned delivery vehicle 1 indicated by the received vehicle body information, and authenticates the user based on the reception code and the standby area (Step S222). Further, when the user is authenticated, the unlocking instruction module 57 uses information on the user, the package, and the unmanned delivery vehicle 1 storing that package, which are stored in the memory 22 in association with one another, to identify, as an unlocking target, the unmanned delivery vehicle 1 and storage 16 storing a package addressed to the authenticated user (Step S223). Then, when the unlocking target is identified, the unlocking instruction module 57 transmits, to the unmanned delivery vehicle 1 which has transmitted the reception code, information (unlocking target information) on the unmanned delivery vehicle 1 being the unlocking target (Step S224). The unmanned delivery vehicle 1 receives the unlocking target information (Step S131), and displays, on the display of the input/output unit 14, a screen indicating the unmanned delivery vehicle 1 from which the package can be received (Step S132). Further, the unlocking instruction module 57 transmits, to the unmanned delivery vehicle 1 being the unlocking target, an unlocking instruction to unlock the storage 16 being the unlocking target (Step S225). The unlocking instruction includes information (e.g., identification information on storage 16 or information for identifying user who is to receive package) indicating the storage 16 being the unlocking target.

Figure 10:
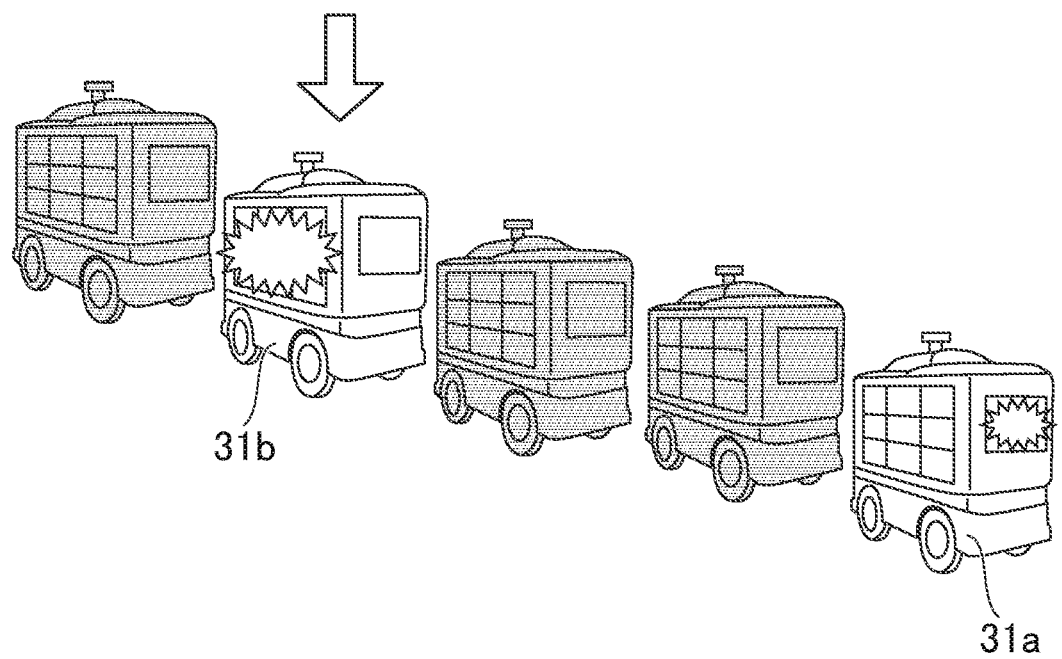
FIG. 10 is a diagram for illustrating an example of a screen showing an unmanned delivery vehicle from which a package can be received.

FIG. 10 is a diagram for illustrating an example of a screen representing the unmanned delivery vehicle 1 from which the package can be received. FIG. 10 is an example of a case in which there are three or more unmanned delivery vehicles 1 in the standby area, and shows a delivery vehicle image 31a indicating the unmanned delivery vehicle 1a operated by the user and a delivery vehicle image 31b indicating the unmanned delivery vehicle 1b storing a package addressed to the user in such a manner as to distinguish the delivery vehicle image 31a and the delivery vehicle image 31b from the other unmanned delivery vehicles 1. In particular, the delivery vehicle image 31b indicating the unmanned delivery vehicle 1b storing the package addressed to the user is highlighted by an arrow or color, for example, to thereby enable the user who has viewed the screen to intuitively grasp a method of receiving the package.

The unlocking module 58 of the unmanned delivery vehicle 1 receives an unlocking instruction (Step S141). Then, the unlocking module 58 unlocks a door of the storage 16 indicated by the unlocking instruction (Step S142). Then, the reception detection module 59 waits until the user receives the package (Step S143). More specifically, the reception detection module 59 may perform such detection repeatedly until a sensor mounted to the storage 16 has detected the fact that there is no package in the storage 16, or until a sensor mounted to the door of the storage 16 has detected the fact that the door of the storage 16 is closed.

When the user has received the package, the reception detection module 59 transmits delivery completion information indicating completion of the delivery to the user to the central server 2 (Step S144). When the unlocking instruction module 57 of the central server 2 has received the delivery completion information, the unlocking instruction module 57 transmits a delivery completion notification to the user (Step S241). Meanwhile, the association control module 53 of the unmanned delivery vehicle 1 cancels pairing with the other unmanned delivery vehicle 1 (Step S145), and the movement control module 51 starts to return to the delivery base 3, or starts to move to the next delivery destination (Step S146).

In the first embodiment, even when the unmanned delivery vehicle 1 to which the user inputs a reception code and the unmanned delivery vehicle 1 storing a package addressed to the user are different from each other, it is possible to unlock the storage 16 storing the package. With this, even when the user cannot identify the unmanned delivery vehicle 1 storing a package addressed to himself or herself from among the plurality of unmanned delivery vehicles 1 in the standby area, the user may input a reception code into any one of the unmanned delivery vehicles 1. Thus, the user is not required to repeatedly input a reception code. Further, as illustrated in FIG. 7, the input/output units 14 of a part of the unmanned delivery vehicles 1 are hidden by other unmanned delivery vehicles 1, to thereby reduce a possibility of the user having a difficulty in choosing to which input/output unit 14 of the unmanned delivery vehicle 1 the reception code is to be input. As a result, it is possible to reduce a load on the user at the time of receiving a package.

Second Embodiment

In the first embodiment, the central server 2 authenticates the user who has input a reception code and instructs the storage 16 storing a package addressed to the user to be unlocked. Such authentication and unlocking instruction may be performed by the unmanned delivery vehicle 1b storing a package. In a second embodiment of the present invention, in the following, description is made of a delivery system in which the unmanned delivery vehicle 1b storing a package performs such authentication and unlocking instruction. Now, description is mainly made of differences between the second embodiment and the first embodiment.

Figure 11:
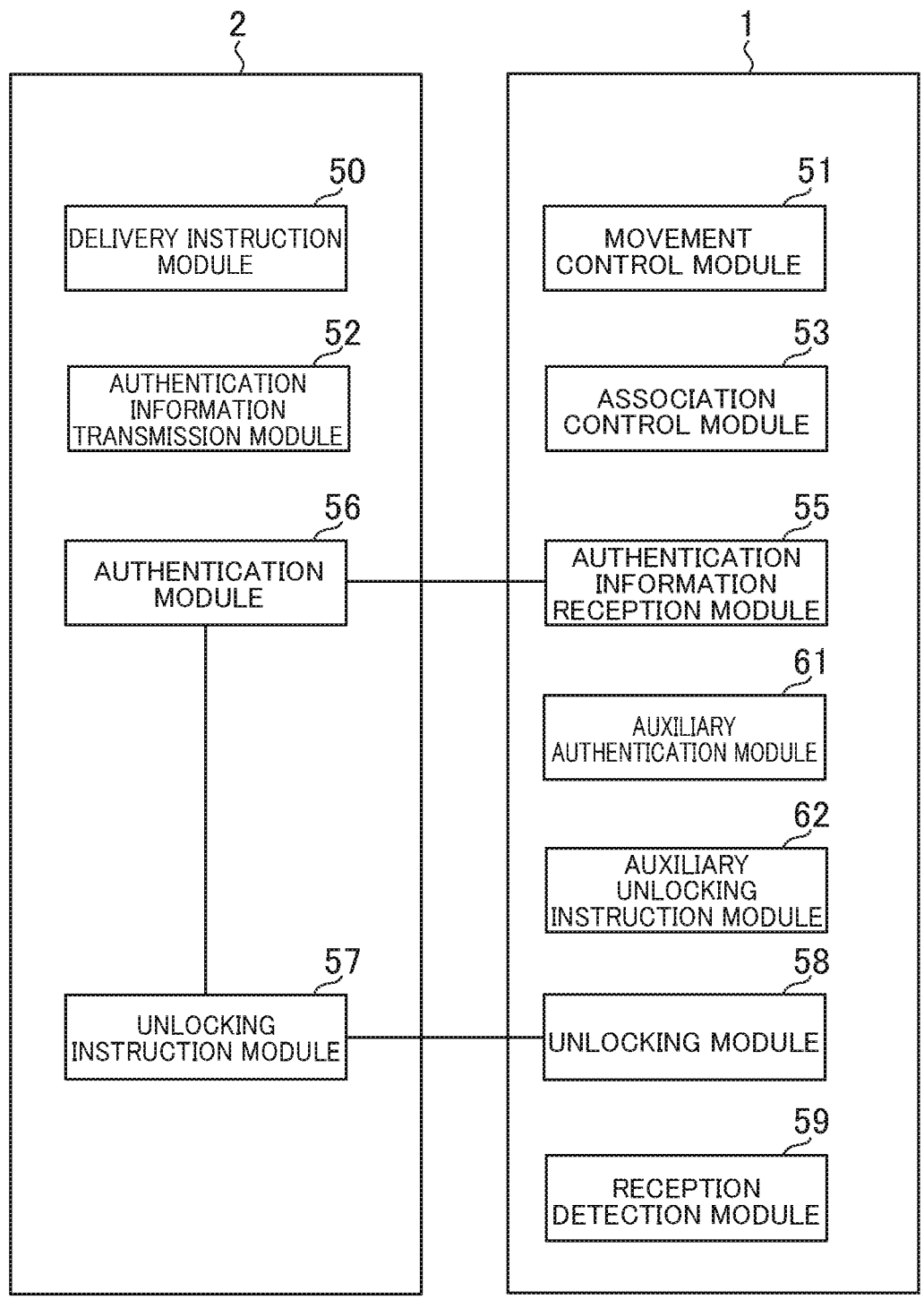
FIG. 11 is a block diagram for illustrating functions to be implemented by a delivery system according to a second embodiment of the present invention.

FIG. 11 is a block diagram for illustrating functions to be implemented by a delivery system according to the second embodiment. In the second embodiment, the unmanned delivery vehicle 1 includes, from the functional point of view, an auxiliary authentication module 61 and an auxiliary unlocking instruction module 62 in addition to the functions illustrated in FIG. 5 of the first embodiment. The auxiliary authentication module 61 and the auxiliary unlocking instruction module 62 are implemented by the processor 11 included in the unmanned delivery vehicle 1 executing programs stored in the memory 12 to control the communication unit 13. The auxiliary authentication module 61 and the auxiliary unlocking instruction module 62 are functions similar to those of the authentication module 56 and the unlocking instruction module 57, respectively, and when the unmanned delivery vehicle 1 and the central server 2 have a difficulty in communicating to/from each other, the processing of the auxiliary authentication module 61 and the auxiliary unlocking instruction module 62 is executed.

Figure 12:
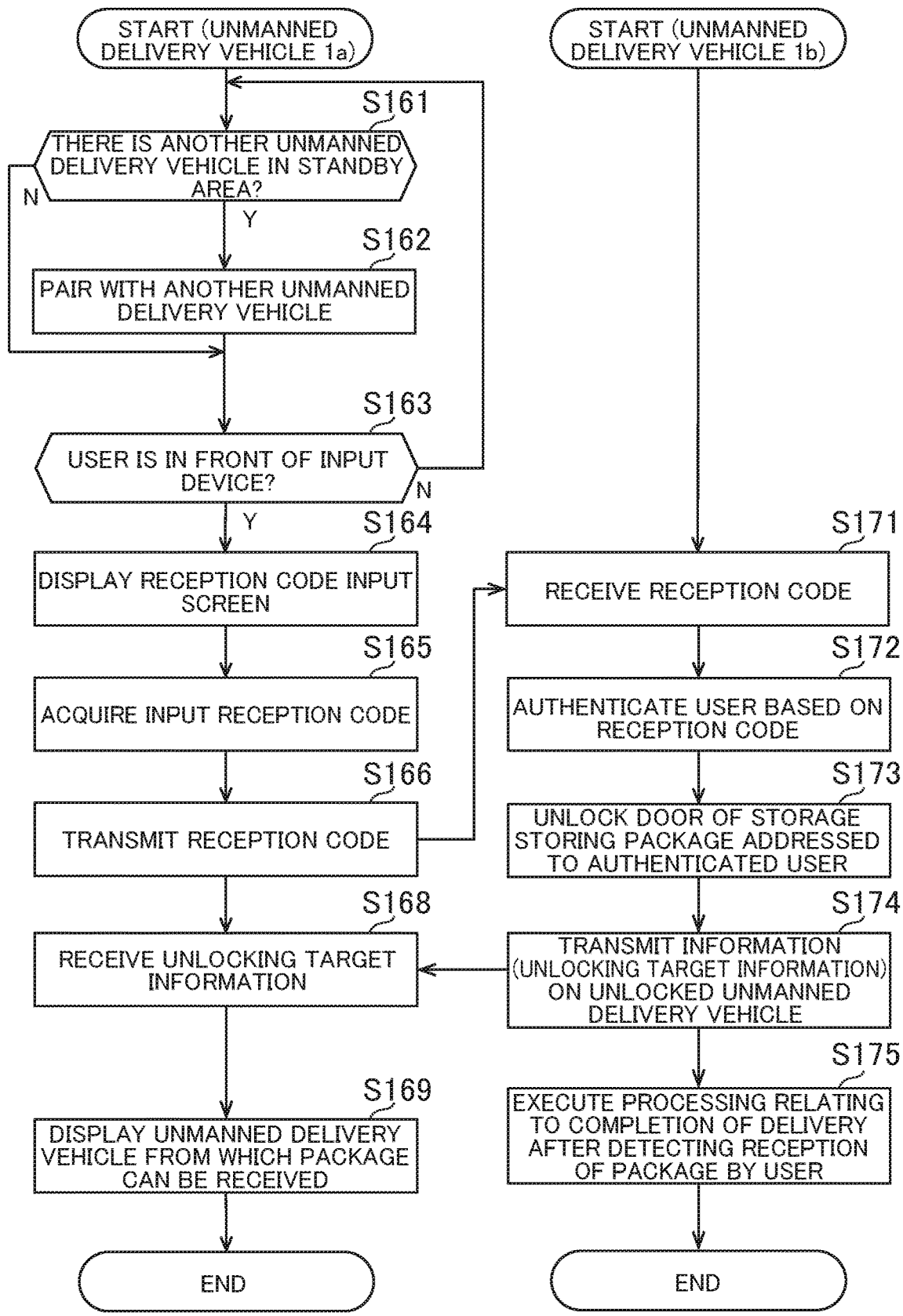
FIG. 12 is a flow chart for illustrating an example of processing to be executed by a plurality of unmanned delivery vehicles after the plurality of unmanned delivery vehicles have started to wait at the delivery destination.

FIG. 12 is a flow chart for illustrating an example of processing to be executed by the plurality of unmanned delivery vehicles 1a and 1b after the plurality of unmanned delivery vehicles 1a and 1b have started to wait at the delivery destination. The processing illustrated in FIG. 12 is executed when the unmanned delivery vehicle 1 and the central server 2 are not communicably connected. When the unmanned delivery vehicle 1 and the central server 2 are communicably connected, the processing described with reference to FIG. 8 in the first embodiment is executed. The processing until the unmanned delivery vehicle arrives at the delivery destination before the processing is also similar to that of the first embodiment, and thus description thereof is omitted here. In the processing of FIG. 12, a reception code that is received by the unmanned delivery vehicle 1 (e.g., unmanned delivery vehicle 1b) storing a package addressed to the user in Step S107 of FIG. 6 and is stored in association with the storage 16 corresponding to the memory 12 is used. Now, description is made of processing in a case in which there are the unmanned delivery vehicle 1a to which the user inputs a reception code and the unmanned delivery vehicle 1b storing a package to be received by the user.

Within the processing illustrated in FIG. 12, the processing of from Step S161 to Step S165 is similar to those of from Step S121 to Step S125 illustrated in FIG. 8, and thus description thereof is omitted here. When the authentication information reception module 55 has acquired a reception code from the user in Step S165, the authentication information reception module 55 transmits the reception code to the other paired unmanned delivery vehicle 1 (unmanned delivery vehicle 1b) (Step S166). The authentication information reception module 55 may transmit the reception code to all the other unmanned delivery vehicles 1.

The auxiliary authentication module 61 of the unmanned delivery vehicle 1b receives the reception code via the communication unit 13 (Step S171). The auxiliary authentication module 61 authenticates the input user based on the received reception code and the reception code stored in the memory 12 in Step S107 (Step S172). When the received reception code is not stored in the memory 12 and authentication has failed, the auxiliary authentication module 61 transmits information indicating an authentication failure to the unmanned delivery vehicle 1.

When the user is authenticated by the auxiliary authentication module 61, the auxiliary unlocking instruction module 62 uses the identification information stored in the storage 16 in association with the reception code of the authenticated user to identify, as the unlocking target, the storage 16 storing a package addressed to the user, and the unlocking module 58 unlocks the key of the door of the identified storage 16 (Step S173). Further, the auxiliary unlocking instruction module 62 transmits, to the unmanned delivery vehicle 1 having received the reception code, information (unlocking target information) which indicates that the own unmanned delivery vehicle 1 is unlocked (Step S174). The unmanned delivery vehicle 1a receives the unlocking target information (Step S168), and displays, on the display of the input/output unit 14, a screen indicating the unmanned delivery vehicle 1b from which the package can be received (Step S169). The processing of Step S169 is similar to that of Step S132 of FIG. 8. Further, the reception detection module 59 executes processing relating to completion of delivery after detecting reception of the package by the user (Step S175). The processing of Step S175 is similar to those of from Step S143 to Step S146 of FIG. 9, and thus a detailed description thereof is omitted here.

In the second embodiment, similarly to the first embodiment, even when the unmanned delivery vehicle 1 to which the user inputs a reception code and the unmanned delivery vehicle 1 storing a package addressed to the user are different from each other, the user can easily receive the package. Further, communication to/from the central server 2 is not indispensable when the user receives a package, and thus it is possible to receive a package even when communication between the unmanned delivery vehicle 1 and the central server 2 is unstable.

Third Embodiment

In a third embodiment of the present invention, contrary to the second embodiment, the unmanned delivery vehicle 1a to which the user inputs the reception code authenticates the reception code and gives an unlocking instruction. Now, description is mainly made of a difference between the second embodiment and the first embodiment.

Figure 13:
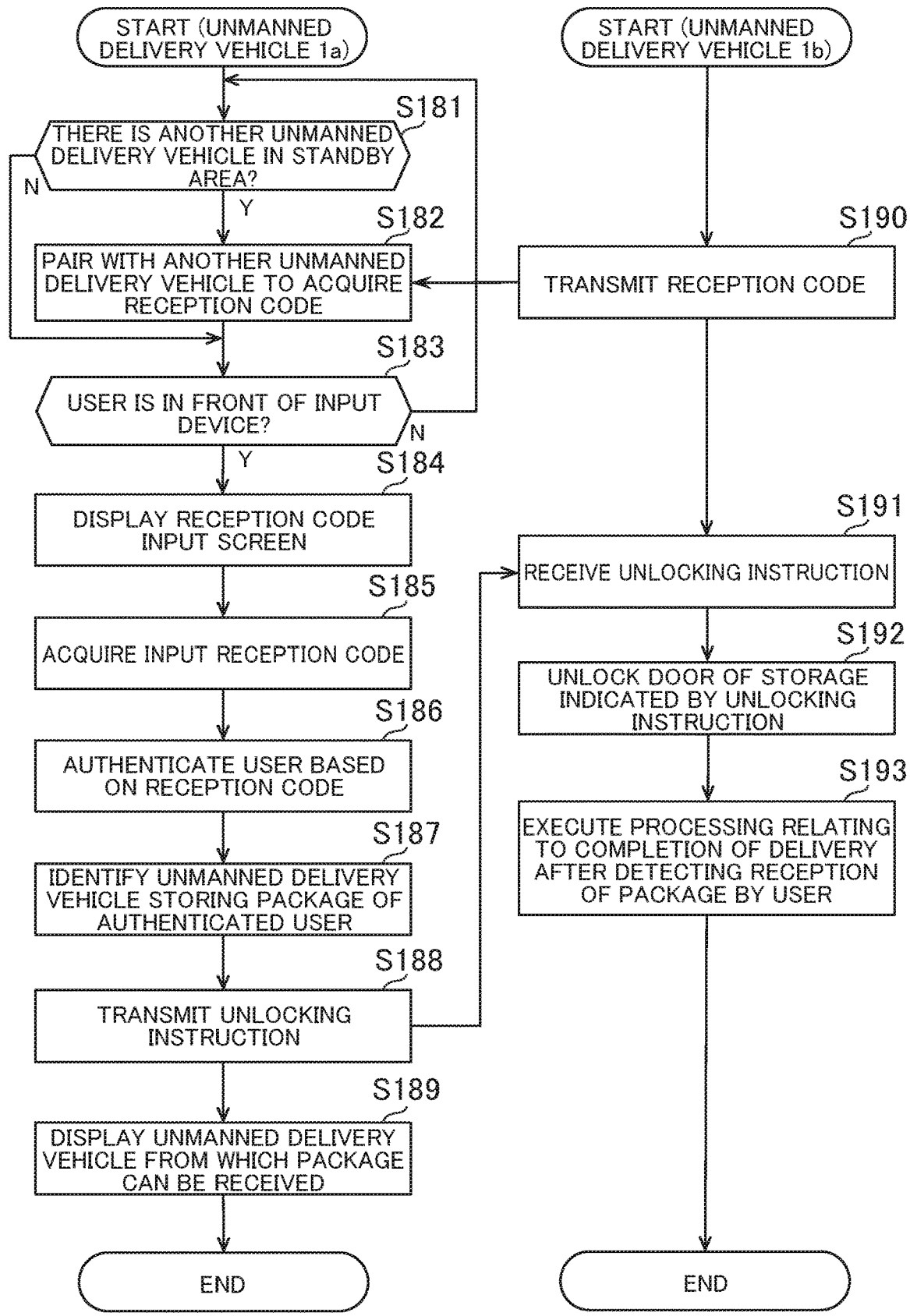
FIG. 13 is a flow chart for illustrating an example of processing to be executed by the plurality of unmanned delivery vehicles in a third embodiment of the present invention.

FIG. 13 is a flow chart for illustrating an example of processing to be executed by the plurality of unmanned delivery vehicles 1a and 1b in the third embodiment. FIG. 13 is an example of an illustration of processing to be executed after the plurality of unmanned delivery vehicles 1a and 1b have started to wait at the delivery destination. The processing illustrated in FIG. 13 may be executed when the unmanned delivery vehicle 1 and the central server 2 are not communicably connected to each other. It is assumed that a reception code received by the unmanned delivery vehicle 1 (e.g., unmanned delivery vehicle 1b) storing a package addressed to the user in Step S107 of FIG. 6 is stored, in advance, in the memory 12 in association with the corresponding storage 16. Now, description is made of processing in a case in which there are the unmanned delivery vehicle 1a to which the user inputs a reception code and the unmanned delivery vehicle 1b storing a package to be received by the user.

First, the association control module 53 of the unmanned delivery vehicle 1a determines whether there is another unmanned delivery vehicle 1b in the standby area (Step S181). Then, when there is another unmanned delivery vehicle 1b in the standby area (Y in Step S181), the association control module 53 pairs with the existing another unmanned delivery vehicle 1b to receive a combination of the vehicle body information, the reception code of a package to be delivered in this standby area, and identification information on the storage 16 storing the package (Step S182). In response to this, the association control module 53 of the unmanned delivery vehicle 1b transmits a combination of the vehicle body information, the reception code, and the identification information on the storage 16 (Step S190). The association control module 53 of the unmanned delivery vehicle 1a stores the vehicle body information, the identification information on the storage 16, and the reception code into the memory 12 in association with one another (Step S182). On the contrary, when there is no other unmanned delivery vehicle 1 in the standby area (N in Step S181), the association control module 53 skips Step S182.

Next, when the user is not in front of the touch panel of the input/output unit 14 (N in Step S183), the authentication information reception module 55 repeats the processing from Step S181. The processing of Step S181 and Step S183 is similar to that of Step S121 and Step S123 of FIG. 8 of the first embodiment. The subsequent processing of Step S184 and Step S185 is similar to the processing of Step S124 and Step S125 of FIG. 8, and thus description thereof is omitted here.

In Step S185, when the reception code is acquired from the user, the auxiliary authentication module 61 authenticates the user who has input the reception code based on the acquired reception code and the reception code stored in the memory 12 in Step S182 (Step S186). When the acquired reception code is not stored in the memory 12, and the user cannot be authenticated, the auxiliary authentication module 61 displays on the screen information which indicates the reception code is not appropriate.

When the user is authenticated by the auxiliary authentication module 61, the auxiliary unlocking instruction module 62 of the unmanned delivery vehicle 1a identifies, as the unlocking target, the unmanned delivery vehicle 1b and the storage 16 storing a package addressed to the user based on the vehicle body information and the identification information on the storage 16 stored in the memory 12 in association with the reception code of the authenticated user (Step S187), and transmits, to the identified unmanned delivery vehicle 1b, an unlocking instruction to unlock the key of the door of the identified storage 16 (Step S188).

The unlocking module 58 of the unmanned delivery vehicle 1b receives the unlocking instruction (Step S191). The unlocking module 58 unlocks the door of the storage 16 indicated by the unlocking instruction (Step S192). The auxiliary unlocking instruction module 62 may not identify the storage 16. The auxiliary unlocking instruction module 62 may transmit the unlocking instruction including information (e.g., reception code) for identifying the user or package to the identified unmanned delivery vehicle 1b, and the unlocking module 58 may identify the storage 16 to be unlocked based on the unlocking instruction.

Then, after the reception detection module 59 has detected reception of the package by the user, the reception detection module 59 executes processing relating to completion of delivery (Step S193). The processing of Step S193 is similar to those of from Step S143 to Step S146 of FIG. 9, and thus a detailed description thereof is omitted here.

Also in the third embodiment, even when the unmanned delivery vehicle 1 to which the user inputs a reception code and the unmanned delivery vehicle 1 storing a package addressed to the user are different from each other, the user can easily receive the package. Further, communication to/from the central server 2 is not indispensable when the user receives a package, and thus it is possible to receive a package even when communication between the unmanned delivery vehicle 1 and the central server 2 is unstable. The unmanned delivery vehicle 1a has acquired the reception code and the vehicle body information at the time of pairing (refer to Step S182), but the unmanned delivery vehicle 1a may acquire those pieces of information from the central server 2 separately.

Fourth Embodiment

In a fourth embodiment of the present invention, the central server 2 authenticates the user based on the reception code, and the unmanned delivery vehicle 1a to which the user has input a reception code gives an unlocking instruction. Now, description is mainly made of differences between the fourth embodiment and the first embodiment.

Figure 14:
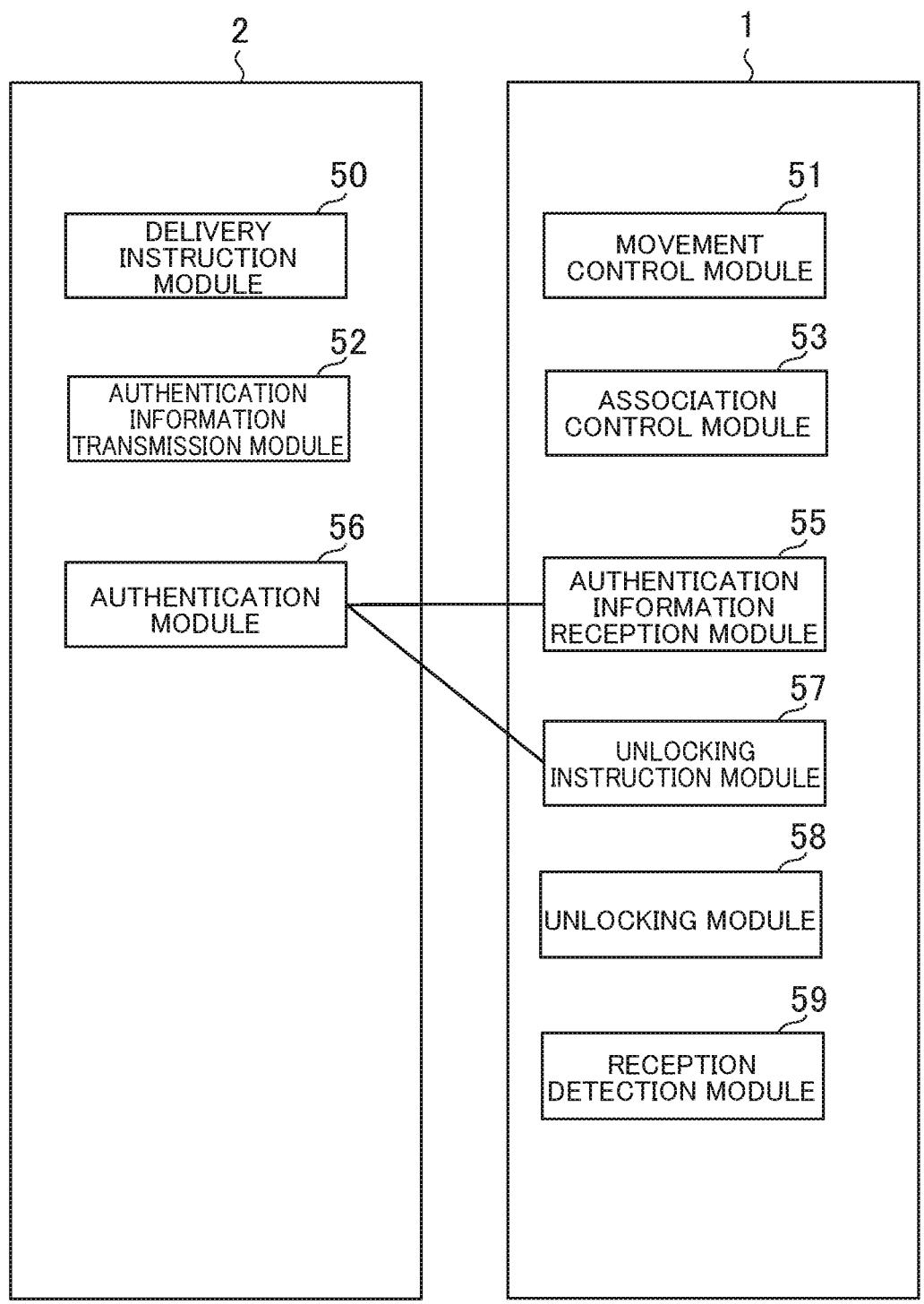
FIG. 14 is a block diagram for illustrating functions to be implemented by a delivery system according to a fourth embodiment of the present invention.

FIG. 14 is a block diagram for illustrating functions to be implemented by the delivery system according to the fourth embodiment. In the fourth embodiment, the unlocking instruction module 57 is provided not in the central server 2 but in the unmanned delivery vehicle 1. The unlocking instruction module 57 is implemented by the processor 11 executing a program stored in the memory 12.

Figure 15:
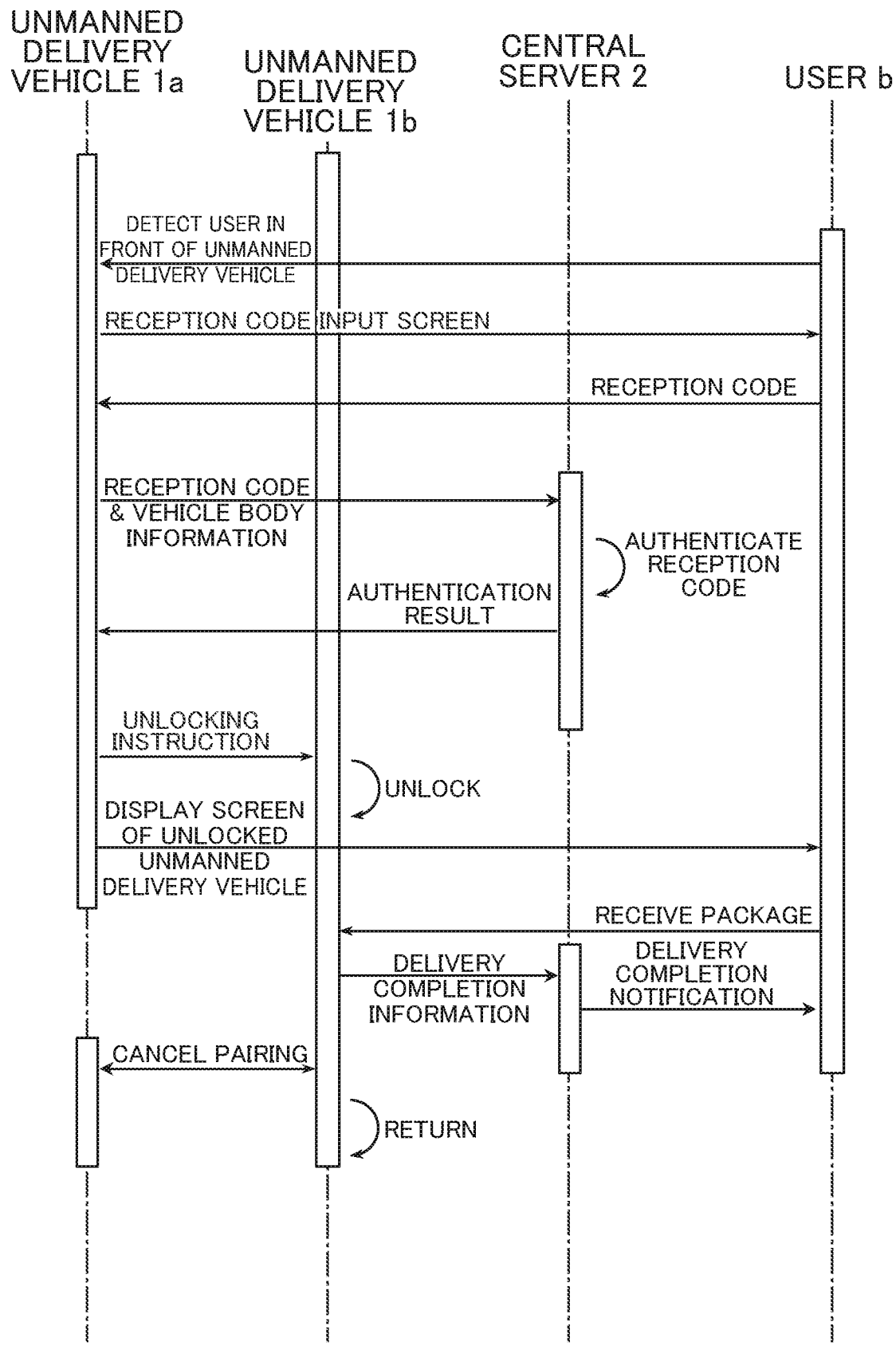
FIG. 15 is a sequence diagram for illustrating an operation of the delivery system.

FIG. 15 is a sequence diagram for illustrating an operation of the delivery system, which is a diagram corresponding to FIG. 4 of the first embodiment. The fourth embodiment is different from the first embodiment in a period after a reception code has been input until the user has received a package. When the central server 2 has received a reception code and vehicle body information, the central server 2 confirms whether the reception code is appropriate, and authenticates the user "b", who has input the reception code. Then, the central server 2 transmits the authentication result to the unmanned delivery vehicle 1a. When the user is authenticated and the unmanned delivery vehicle 1a has received the authentication result, the unmanned delivery vehicle 1a transmits an unlocking instruction to another unmanned delivery vehicle 1b storing a package addressed to the user, and the unmanned delivery vehicle 1b unlocks the storage 16 storing the package. The unmanned delivery vehicle 1a displays the unlocked unmanned delivery vehicle 1b on the display.

Figure 16:
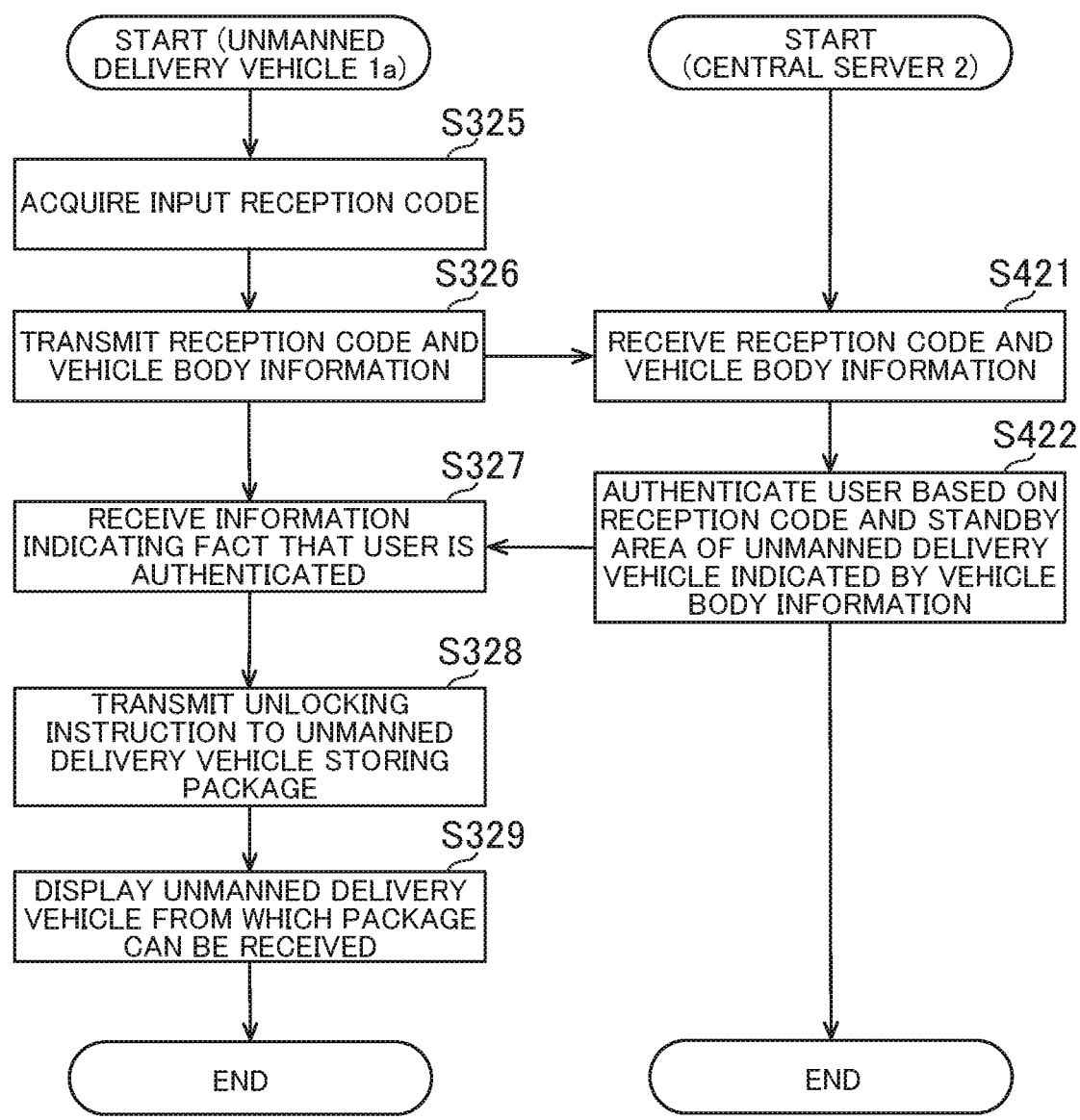
FIG. 16 is a flow chart for illustrating an example of processing to be executed at the time of passing a package.

FIG. 16 is a flow chart for illustrating an example of processing to be executed at the time of passing a package, which is a diagram corresponding to the processing of Step S125 and its subsequent processing of FIG. 8 of the first embodiment. Processing similar to those of from Step S121 to Step S124 of FIG. 8 is executed also in the fourth embodiment, but description thereof is omitted here.

The authentication information reception module 55 of the unmanned delivery vehicle 1a receives a reception code from the input/output unit 14 (Step S325). When the authentication information reception module 55 has acquired the reception code, the authentication information reception module 55 transmits the reception code and vehicle body information to the central server 2 (Step S326). Instead of a reception code, information (e.g., hash value) obtained by processing the reception code may be transmitted, or the reception code may include information for identifying the unmanned delivery vehicle 1 storing a package.

The authentication module 56 of the central server 2 receives the reception code and vehicle body information via the communication unit 23 (Step S421). The authentication module 56 acquires a standby area included in arrival information previously received from the unmanned delivery vehicle 1 indicated by the received vehicle body information, and authenticates the user based on the reception code and the standby area (Step S422). Then, the authentication module 56 transmits information indicating the fact that the user is authenticated to the unmanned delivery vehicle 1a. The unlocking instruction module 57 of the unmanned delivery vehicle 1a receives the information indicating the fact that the user is authenticated (Step S327), and the unlocking instruction module 57 transmits an unlocking instruction to the unmanned delivery vehicle 1b storing the package (Step S328). Further, the unlocking instruction module 57 displays, on the display of the input/output unit 14, a screen indicating the unmanned delivery vehicle 1 from which the package can be received (Step S330). Although not shown, the unlocking module 58 of the unmanned delivery vehicle 1b having received an unlocking instruction determines the storage 16 storing the package based on the unlocking instruction, and unlocks the key of the door of the identified storage 16. The subsequent processing is similar to that of the first embodiment, and thus description thereof is omitted here.

Also in the fourth embodiment, similarly to the first embodiment, even when the unmanned delivery vehicle 1 to which the user inputs a reception code and the unmanned delivery vehicle 1 storing a package addressed to the user are different from each other, the user can easily receive the package.

Fifth Embodiment

In a fifth embodiment of the present invention, the unmanned delivery vehicle 1a authenticates the user based on the reception code, and the central server 2 transmits an unlocking instruction to the unmanned delivery vehicle 1b storing a package. In the fifth embodiment, contrary to the first embodiment, the authentication module 56 is arranged in the unmanned delivery vehicle 1. In the fifth embodiment, processing until the authentication module 56 of the unmanned delivery vehicle 1a authenticates the user (until Step S186 of FIG. 13) is similar to that of the third embodiment. The processing of the auxiliary authentication module 61 is executed by the authentication module 56. Further, when the user is authenticated, the authentication module 56 transmits an authentication result to the central server 2 together with information indicating the reception code. Then, the central server 2 identifies the unmanned delivery vehicle 1b being an unlocking target based on the authentication result, transmits an unlocking instruction, and transmits information indicating the unlocking target to the unmanned delivery vehicle 1a. Such processing is similar to those of the first embodiment. Also in the fifth embodiment, even when the unmanned delivery vehicle 1 to which the user inputs a reception code and the unmanned delivery vehicle 1 storing a package addressed to the user are different from each other, the user can easily receive the package.

The invention claimed is:

1. A package delivery method, comprising:
   receiving, by a first unmanned delivery vehicle, authentication information input by a user; and
   unlocking, by a second unmanned delivery vehicle, a key of a storage of the second unmanned delivery vehicle, which stores a package addressed to the user, based on the authentication information received by the first unmanned delivery vehicle.

2. The package delivery method according to claim 1, further comprising:
   authenticating, by a server, when receiving the authentication information from the first unmanned delivery vehicle, the user based on the received authentication information; and
   transmitting, by the server, to the second unmanned delivery vehicle, an instruction to unlock the key of the storage storing the package addressed to the user when the package addressed to the user is stored in the second unmanned delivery vehicle.

3. The package delivery method according to claim 1, further comprising authenticating, when the second unmanned delivery vehicle has received the authentication information from the first unmanned delivery vehicle and the package addressed to the user is stored in the second unmanned delivery vehicle, the user who has input the received authentication information,
   wherein the unlocking includes unlocking, by the second unmanned delivery vehicle, the key of the storage storing the package addressed to the user when the user is authenticated.

4. The package delivery method according to claim 1, further comprising:
   authenticating, by the first unmanned delivery vehicle, the user based on the authentication information; and
   transmitting, by the first unmanned delivery vehicle, to the second unmanned delivery vehicle, an instruction to unlock the key of the storage storing the package addressed to the user when the package addressed to the user is stored in the second unmanned delivery vehicle.

5. The package delivery method according to claim 4, further comprising:
   transmitting, by a server, the authentication information to the user; and
   transmitting, by the server, to the first unmanned delivery vehicle, determination information for determining whether the authentication information for authenticating the user is appropriate,
   wherein authenticating the user includes authenticating, by the first unmanned delivery vehicle, the user based on the authentication information and the determination information.

6. The package delivery method according to claim 1, further comprising:
   authenticating, by a server, when receiving the authentication information from the first unmanned delivery vehicle, the user who has input the received authentication information; and
   transmitting, by the first unmanned delivery vehicle, to the second unmanned delivery vehicle, an instruction to unlock the key of the storage storing the package addressed to the user when the user is authenticated and the package addressed to the user is stored in the second unmanned delivery vehicle.

7. The package delivery method according to claim 1, further comprising transmitting, by the server, the authentication information to the user.

8. The package delivery method according to claim 1, wherein the first unmanned delivery vehicle includes a storage,
wherein a periphery of each of the first and second unmanned delivery vehicles includes a first surface on which a door of the storage is arranged, a second surface, which faces a direction different from a direction of the first surface, and on which a device for inputting the authentication information is arranged, and a third surface opposed to the second surface, and
wherein the package delivery method further comprises moving at least one of the first unmanned delivery vehicle or the second unmanned delivery vehicle so that the second surface of one of the first unmanned delivery vehicle and the second unmanned delivery vehicle is adjacent to the third surface of another of the first unmanned delivery vehicle and the second unmanned delivery vehicle.

9. A package delivery system, comprising:
at least one processor; and
at least one memory device that stores a plurality of instructions which, when executed by the at least one processor, causes the at least one processor to:
receive authentication information input by a user; and
unlock a key of a storage of a second unmanned delivery vehicle, which stores a package addressed to the user, based on the authentication information received by a first unmanned delivery vehicle.

10. A delivery management device, comprising:
at least one processor; and
at least one memory device that stores a plurality of instructions which, when executed by the at least one processor, causes the at least one processor to:
acquire authentication information input by a user to a first unmanned delivery vehicle;
authenticate the user based on the authentication information; and
transmit, to a second unmanned delivery vehicle, an instruction to unlock a key of a storage storing a package addressed to the user when the package addressed to the user is stored in the second unmanned delivery vehicle.

* * * * *